US012755426B2

(12) United States Patent
Powers et al.

(10) Patent No.: US 12,755,426 B2
(45) Date of Patent: Oct. 6, 2026

(54) HAND-HELD CONTROLLER POSE TRACKING SYSTEM

(71) Applicant: Arcturus Industries LLC, Fulshear, TX (US)

(72) Inventors: Jeffrey Roger Powers, Boulder, CO (US); Nicolas Burrus, Madrid (ES); Martin Christophe Laurent Brossard, Madrid (ES)

(73) Assignee: Arcturus Industries LLC, Bellevue, WA (US)

( * ) Notice: Subject to any disclaimer, the term of this patent is extended or adjusted under 35 U.S.C. 154(b) by 236 days.

(21) Appl. No.: 18/687,124

(22) PCT Filed: Aug. 8, 2022

(86) PCT No.: PCT/US2022/074646
§ 371 (c)(1),
(2) Date: Feb. 27, 2024

(87) PCT Pub. No.: WO2023/019096
PCT Pub. Date: Feb. 16, 2023

(65) Prior Publication Data

US 2024/0221216 A1 Jul. 4, 2024

Related U.S. Application Data

(60) Provisional application No. 63/260,094, filed on Aug. 9, 2021.

(51) Int. Cl.
*G06T 7/73* (2017.01)
*G06F 3/01* (2006.01)
*G06T 7/62* (2017.01)

(52) U.S. Cl.
CPC ................ *G06T 7/75* (2017.01); *G06F 3/017* (2013.01); *G06T 7/62* (2017.01); *G06T 2207/20084* (2013.01)

(58) Field of Classification Search
CPC ... G06T 7/75; G06T 7/62; G06T 2207/20084; G06T 7/246; G06T 7/277; G06T 7/292; G06T 7/73; G06F 3/017; G06V 10/25; G06V 20/20
See application file for complete search history.

(56) References Cited

U.S. PATENT DOCUMENTS

| | | | | | |
|---|---|---|---|---|---|
| 10,565,731 | B1 * | 2/2020 | Reddy | G06F 3/012 |
| 2019/0012835 | A1 * | 1/2019 | Bleyer | G06T 19/006 |
| 2019/0033988 | A1 * | 1/2019 | Hesch | G06F 3/0346 |

* cited by examiner

*Primary Examiner* — Tom Y Lu
(74) *Attorney, Agent, or Firm* — Lee & Hayes, P.C.

(57) ABSTRACT

A system configured to determine poses of a pair hand-held controller in a physical environment and to utilize the poses as an input to control or manipulate a virtual environment or mixed reality environment. In some cases, the system may capture image data of the controllers having constellations or patterns. The system may analyze the image data to identify points associated with the constellations or patterns and to determine the poses and disambiguate the identity of the individual controllers based on the identified points and a stored model associated with each controller.

20 Claims, 12 Drawing Sheets

1200

HAND-HELD CONTROLLER POSE TRACKING SYSTEM

CROSS-REFERENCE TO RELATED APPLICATION(S)

This application is a U.S. national stage application under 35 USC § 371 of International Application No. PCT/US22/74646 filed on Aug. 8, 2022 and entitled "Hand-Held Controller pose tracking system", which claims priority to U.S. Provisional Application No. 63/260,094 filed on Aug. 9, 2021 and entitled "CONTROLLER TRACKING SYSTEM", which is incorporated herein by reference in its entirety.

BACKGROUND

The presence of three dimensional (3D) imaging and virtual reality systems in today's world is becoming more and more common. In some cases, the imaging system or virtual reality system may be configured to allow a user to interact with the virtual environment based on the pose or position of one or more hand-held controllers relative to the user and/or objects within the virtual environment. Conventional systems, typically rely on multiple external imaging devices positioned in the environment of the user to triangulate the pose and identify the object. Unfortunately, use of the external imaging devices restricts the user to a predefined area or space.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
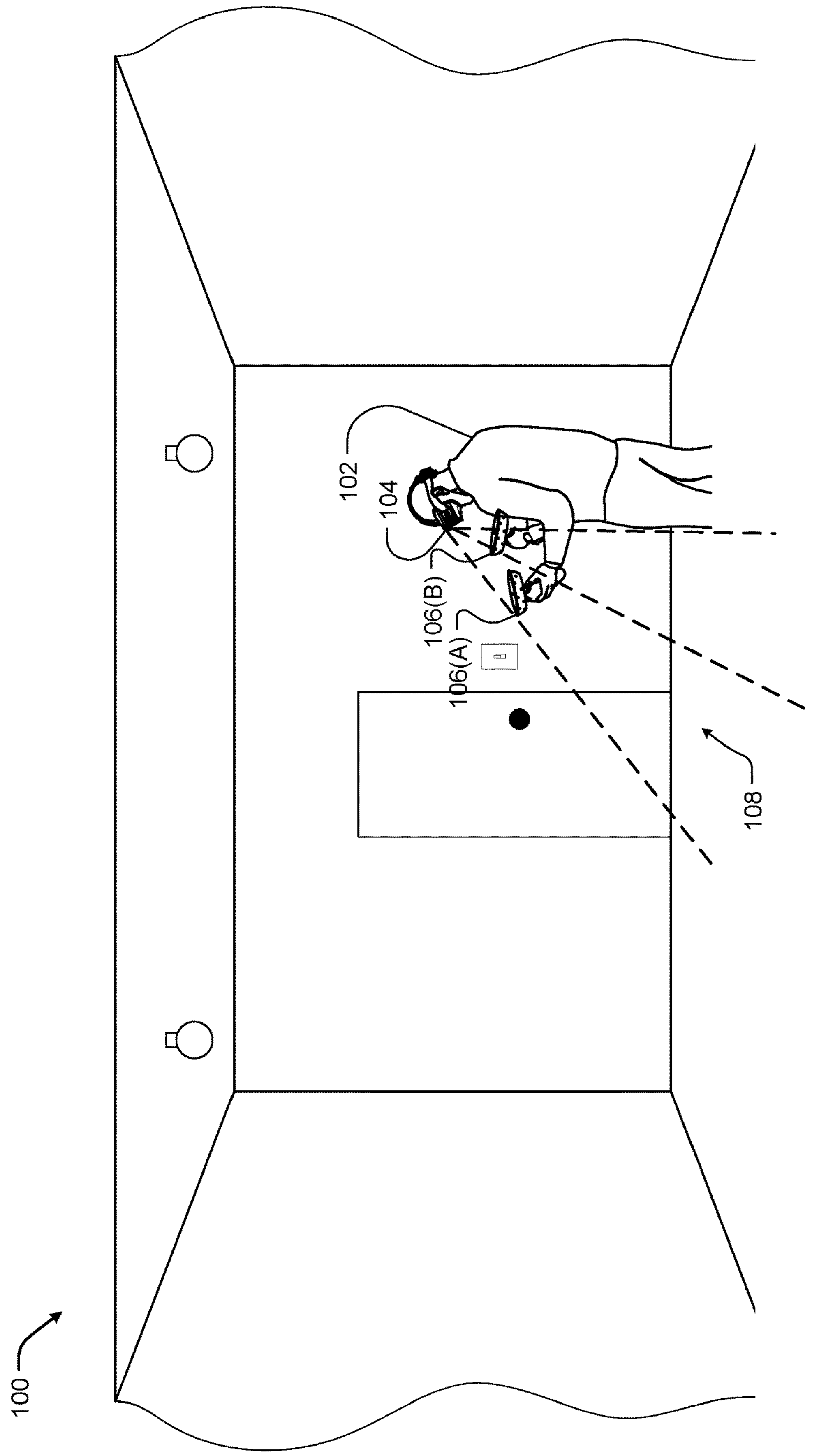
FIG. 1 illustrates an example user engaged with a virtual environment generated by an imaging system according to some implementations.

This disclosure includes techniques and implementations for determining current or predicted future six-degree of freedom (6DOF) poses of one or more hand-held controllers, such as a pair of hand-held controllers, associated with a virtual or mixed reality system. For example, an image system or virtual reality system, such as a headset device, may be configured to allow a user to interact with objects in a virtual world or environment based at least in part on the pose of the hand-held controllers. For instance, the headset device may be configured to utilize the pose of the controllers as a control input or user input with respect to the portion of the virtual environment currently visible to the user via the headset device. In order to determine the pose of the controllers, the headset device may include one or more image components or devices to capture image data of the physical environment including image data of each of the hand-held controllers currently being operated by the user.

Unlike conventional systems that typically rely on multiple external imaging devices positioned in the physical environment to capture images of physical environment from multiple angles, the system discussed herein may utilize image data captured by the headset device from substantially the perspective of the user and/or the perspective of the headset device. Accordingly, in one specific example, the image components or devices are incorporated into the headset device itself in a manner that the headset device is a self-contained unit. Thus, unlike the conventional system which restricts the user to a predefined area or space equipped with the external image devices, the system or device described herein allows the user to move from physical environment to physical environment without additional setup or interruption to the virtual experience.

In some implementations, described herein, the image system may be configured to determine a pose, such as a 6DOF pose, of the hand-held controller based at least in part on the image data captured from a single perspective (e.g., the perspective of the headset device and/or the perspective of the user). In these implementations, the hand-held controller may be marked with a predetermined pattern or constellation. For instance, a hand-held controller may be a ridged structure equipped with a number of active components, such as light emitting diodes (LEDs), arranged according to the predetermined pattern or constellation.

The headset device may also maintain a database or data store of object models including model points corresponding to LEDS on the controller. In some cases, the controller models may be utilized in conjunction with the image data including the hand-held controller having the constellations to determine the pose and/or identity of the hand-held controller. For instance, the right hand-held controller may be equipped or arranged with a different constellation than the left hand-held controller and/or the active element (e.g., the LED flashing or activations) of the predetermined pattern of a single constellation on both controllers may differ. Accordingly, each of the hand-held controllers may be equipped with identical constellations and, thus, be interchangeable or reduce complicity during manufacturing while providing different active elements that may allow the headset device to differentiate based on a predetermined or assigned pattern. In one specific example, the headset device may be configured to wirelessly communicate a desired pattern, series of patterns, or model to each of the individual controllers, thereby, assigning each controller a position (e.g., right or left) or identity (e.g., based on the assigned model, patter, constellation, or series of patterns) at the time of use. In some cases, when the identity is assigned, the headset device may determine the position (e.g., right or left) during an initialization period.

In some cases, the LED lights may be configured to emit in the near-visible and/or infrared wavelengths to reduce distraction for the user and/or other individuals in proximity to the user. In these examples, the handset device may also be equipped with image devices for capturing the near-visible and/or infrared wavelengths and, accordingly, the LEDs activation or flashing elements may remain invisible to the user and other nearby individuals, reducing any distraction caused by the hand-held controllers, discussed herein. In some examples, the LEDs may be set illuminate at a high power for a brief period (e.g. 0.5 milliseconds, 1.0 millisecond, or the like), and the image device may be synchronized to expose during the brief period, such that background objects (such as those illuminated by alternate light sources) appears dark. Further, since many light sources are known to flicker at a multiple of power line frequency (e.g. 50 Hz, 60 Hz), the LED illumination and captures can be timed to occur when the light sources are dim or unilluminated.

In some examples, the constellations associated with the hand-held controllers may be represented by the object models as a series of arrangements of model points in three dimensions (e.g., each model includes a series of patterns of the active element over a predefined period of time). Thus, in some examples, the headset device may determine the pose of a hand-held controller based on performing a 3D-2D point correspondence between one or more object models in 3D and the series of patterns of the model points represented within a predefined number of captured images or frames in 2D. For instance, in one example, the headset device may receive a series of frames of a hand-held controller having a constellation with active elements. The headset device may apply a pixel regressor and/or classification model, such as random forest, non-linear regression, neural network (CNN), or other machine learned models, to identify image points (e.g., points in the captured image that may correspond to a point within the constellation on the hand-held controller). The headset device may then determine the pose of the hand-held controller based at least in part on the image points and model points correspondences over the series of frames.

In many cases, the user may be engaged with two or more hand-held controllers, such as a pair of controllers. In these cases, the headset device may, in addition to determining the pose of each controller, also disambiguate between the two or more controllers (e.g., determine which of the hand-held controllers are the left and which of the hand-held controllers are the right). In these cases, each of the hand-held controllers may be equipped with sensors, such as one or more inertial measurement units (IMUs), gyroscopes, accelerometers, magnetometers, or a combination thereof. Accordingly, the hand-held devices may capture or generate IMU data during use. In some examples, each of the hand-held controllers may provide or send the IMU data captured during use to the headset device and the headset device may disambiguate between the pair of controllers based at least in part on the image data of the constellations and/or the IMU data. For instance, the headset device may reduce noise (e.g., eliminate candidate poses) and/or implement constraints on the candidate poses based at least in part on the IMU data.

As one example, the headset device may determine candidate LED locations or positions by applying a thresholding or filtering to the image data captured by image devices of the headset device. For example, the headset device may remove or filter the image data such that only the bright areas remain for further processing. The headset device may then apply a connected component extraction as well as shape filtering (e.g., using a circularity determination) to determine blobs associated with the detected bright areas. In some cases, the blob detection may be assisted or enhanced using IMU data from the hand-held controllers, such as inertia data (e.g., to assist in predicting an expected shape of the blob representing an LED), and the like. The headset device may then determine, for each blob, a location and a size.

Next, the headset device may determine the identity of the blobs, such as during initialization. For example, each constellation point or LED point within the corresponding model may be assigned a unique identifier which may be used to limit or restrain the number of candidates poses based on the blobs detected. For instance, each candidate pose may include a number of image point to model point correspondence sets (e.g., two or four point 2D to 3D correspondences) that could represent the pose of a controller. In some cases, three or more identifications may be utilized to generate up to four candidate poses and a fourth identification may be used to disambiguate or select between the four candidate poses. Accordingly, during initialization, the headset device may determine and/or assign the unique identifiers for each detected blob and corresponding constellation point.

In the system discussed herein the LEDs of the constellation may be grouped into neighboring cliques (such as sets of three or more LEDs) that comprise a single unique identification. By detecting groups of points, the combinatory logic and complexity associated with disambiguating the LEDs (e.g., constellations points) may be reduced with respect to conventional systems. In some examples, the group of constellation points may be formed based on a nearest neighbor or physical proximity in physical space. Thus, three physically proximate LEDs on the hand-held controller may form a group or neighboring clique even when other points may be closer within the image data captured by the headset device due to conditions, such as camera perspective.

In some implementations, such as when the user is in engaged with a single hand-held controller, the system may determine sets of associations of LEDs that may then be utilized to determine candidate poses for the controller. For example, the system may store precomputed or predetermined known nearest neighbors of each model point in the models. The system may then determine for each model point and each detected blob within the image data a set of LED associations (such as a set of three LED associations). Next, for each set of LED associations, the system may generate up to four candidate poses based at least in part on a perspective-3-points (P3P) technique.

In the current example, the headset device may then reject or eliminate candidate poses. For example, the headset device may remove any candidate pose that is not compatible with a gravity estimate based on the IM data of the hand-held controller and a gravity vector of an IM of the headset. For instance, the headset device may apply a threshold between a difference between an angle of the gravity vector and the angle of the controller represented by the candidate pose. For each of the remaining candidate pose, the headset device may extend the set of associations by reprojecting the other model points of the controller model (e.g., the LEDs not associated with the set of associations) and associating the reprojected model points to the closest blob in the image data captured by the headset device. The headset device may accept an association between the model point and the closest blob in the image data when, for example, a distance between the model point and the closet blob is less than a predetermined pixel threshold. For example, 10 pixels may be used as a threshold for a 960×960 image. Accordingly, the pixel threshold may be selected based on a resolution or quality of the image device and/or size of the image data captured by the headset device. In some cases, the pixel threshold may be adjusted as a function of the expected distance between the hand-held controller and the image device (or headset device), as the distance between the model points represented as blobs in the image data decreases as the controller is moved further from the image device (or headset device).

In another example, the headset device may determine if a candidate pose is compatible with the other model points by comparing a normal of the other model points with a vector from the LED to the image device or camera center. For instance, the constellation point is compatible if a difference of the normal and the vector is within a threshold angle. As another example, the headset device may determine if a candidate pose is compatible with the other model points, if the hand-held controller geometry determined from the IM data are in alignment with LEDs of the controller that are occluded by the controller itself. For instance, the headset device may determine if a normal of the occluded LED passes an occlusion check by applying a ray casting approach and determine if the LED passes or fails an occlusion test.

If multiple candidate poses remain after elimination methods discussed above are applied, the headset device may, for each remaining candidate pose, refine each remaining candidate pose using a perspective-n-points (PnP) technique on the extended set of associations. In some cases, a robust cost function, such as Huber loss or Tukey loss, may be applied to remove LED outliers from the extended set of associations. The headset device may then select the candidate pose that has the largest number of associations and/or the lowest average reprojection error. For instance, the system may remove any set of association having less than a threshold umber of associations and then select from the remaining candidate poses based on the lowest average reprojection error. In some examples, the headset device may accept a candidate pose if these largest number of valid associations (e.g., model point to blobs) is above an association threshold (e.g., at least 5, 7, etc. valid associations) and the average reprojection error is below an error threshold (e.g., less than 1.5 pixels).

In some implementations, the method discussed above to determine the pose of a single controller may be extended and applied to users engaged with multiple hand-held controllers by causing the LEDs on each of the hand-held controllers to toggle or alternate activations for each frame captured by the headset device. Accordingly, each adjacent frame of the image data may represent a different hand-held controller. As another implementation, the headset device may include an LED identification module that is configured to determine identification of model points (and, thereby, controllers) based on temporal variations of the LED intensities. In some cases, by causing LEDs to emit temporal variations in intensities, the system may also reduce processing time and computing resource consumption by reducing the second set of LED associations.

In the examples in which the LED identification module is utilized; the controllers may implement an LED intensity component to control the intensity of individual groups of LEDs over predefined periods of time to generate a unique binary sequence for each group of LEDs that may be encoded by mapping each intensity state to a bit. For instance, as one example, the sequence of intensities High, Low, Low, High could correspond to a bit sequence 1001 if the High intensity state is 1 and the Low intensity state is 0. The headset device may then estimate an intensity of each blob representing an LED in the image data over the predetermined period of time based at least in part on the bit sequence and the determined or estimated intensity associated with each LED blob in the image data with a group identifier. The system may then select different groups for each controller to disambiguate the LEDs of each hand-held controller. The system may also generate multiple groups of LEDs for each hand-held controller to reduce the search space during an initialization. It should be understood, that in some examples, the system may utilize a unique bit sequence for each individual LED (opposed to the group of LEDs).

In some examples, the LED identification module may, for each group of LEDs, choose or assign a unique bit sequence. A number of bits for the bit sequences may selected such that the sequence is long enough to cover all the groups with a unique sequence. For example, at least two bit sequences may be utilized to support four groups of LEDs, while three bit sequences may be used to support eight groups of LEDs. In some cases, it may be beneficial to utilize longer sequences to add robustness to the system. For example, a sequence of eight bits may be more robust when used to support a group of four LEDs as the sequence is more difficult to accidentally observe the expected variations in background light sources and other noise. In this manner, the longer bit sequences may be used to eliminate error caused by light sources in the physical environment observed by the headset device other than the hand-held controllers. In some cases, the system may select a unique code or sequence for each group of LEDS based at least in part on Hamming distance between the codes or sequences and, thus, reducing the probability of confusion between two distinct groups of LEDs. In some cases, only variations of intensity are detected (e.g., going from Low to High or from High to Low), the bit detection process may be simplified by having all the bit sequences start with a known bit or intensity. For example, four groups might be selected with the following eight bit sequences: 10010010, 10101011, 11010101, 10100100 in which each bit sequences begins with High intensity or a bit of 1. Additionally, in this example, the bit sequences have a Hamming distance of at least three bits and each bit sequence has at least four transitions.

Once LED-blob correspondences are determined, as discussed herein, the system may associate each detected blob to the corresponding blob in the previous frame of the image data. For instance, the system may assume that a location of each blob does not change too quickly (e.g., more than a threshold number of pixels per frame) and, thus, the system may associate each blob to the closest one in the previous frame. In some cases, the association may be rejected if the corresponding blob is greater than the pixel threshold. For example, at a distance of more than 10 pixels for a 960×960 image. The headset device motion may also be taken into account to determine the candidate location of the blob in the previous frame of the image data by applying a known delta rotation between the two frames, compensating for headset motion and allowing the user to move their headset during LED identification and/or system initialization. In some cases, the system may compute associations each detected blob to the corresponding blob in the previous frame of the image data both taking into account headset device motion and without taking into account headset device motion and selecting the model that more accurate results. In some implementations, the headset device may determine if an intensity of the blob with respect to the associated blob from the previous frame of the image data is higher, lower, or remained the same to determine the next bit (e.g., the current frame bit). These changes may be detected by an intensity threshold based at least in part on a relative average image intensity in the blob or based at least in part on relative size of the blob. For example, if a blob's average pixel intensity is ten percent higher, the detected bit is a 1, if the average pixel intensity is ten percent lower it is a 0, and otherwise it takes the same value as the value assigned in the previous frame.

When the generated bit sequence has at least the same length as the known or assigned group bit sequences, the system may compare the generated bit sequence with the known bit sequences of each group to identify the blob is associated with a group. The identification may be accepted if the sequence is identical or if the Hamming distance to the group is low enough (e.g., within a distance threshold). For example, if the distance is less than or equal to the distance threshold (such as 1 or 2 bits), the identification may be accepted. In some specific example, if an LED-blob generates a substantially constant bit sequence, the LED-blob may be ignored or not assigned an identification, as these constant bit sequences typically correspond to bright clutter or light sources in the background and are not associated with a controller.

In some cases, once the identification is complete, the headset device may begin tracking the pose of each hand-held controller. For example, the headset device may track poses from a subsequent frame to a current frame by estimating a position in the current frame based in part on the subsequent pose and IMU data received from the controller. For instance, the headset device may generate a prediction of the controller pose based at least in part on a visual-inertial state for the current frame by combining the visual estimates determined using the image data with the IMU data or samples. In some cases, the headset device may consider the orientation from the IMU data and estimate at least one translation. For example, the translation may be determined using two LED-blob associations and a P2P technique.

As an illustrative example, the headset may track the pose of the hand-held controller by first computing a predicted translation and orientation from the visual-inertial state. The headset may then for each controller LED of the model and for each candidate blob location in the current frame of the image data check if the LED normal is compatible with the prediction viewpoint, as discussed above, check if the projected LED location is close-enough (e.g., within a threshold pixel distance) from the blob location, and add the association to the candidate set of associations if both checks are passed. Next, for each distinct pair of validated associations, the headset device may generate a pose candidate. For each pose candidate, the headset device may generate an orientation based at least in part on the IM data. Using the orientation, the headset device may estimate the translation based at least in part on minimizing the point-to-line distance of the two LEDs in the controller model with each's respective camera ray determined from the camera center to the blob location in the current frame. Once the set of candidate poses have been computed, the headset device may select one of the candidate poses as discussed above with respect to FIG. 4.

In some examples, the headset device may determine which image device(s) to use in determining and/or tracking the pose of each of the hand-held controllers. For instance, in many cases, only a single image device is required to track poses of a controller. However, when the headset has multiple image devices (e.g., a stereo image system), the image data from the multiple image devices may be used to extend the field of view and reduce visual losses. In some cases, with image data from multiple image devices being used to track a pose, the headset device may need to avoid doubling the LED blobs during extraction by running extraction and/or identification on both sets of image data independently. In one specific case, the headset device may utilize fisheye camera(s) and as a result both hand-held controllers may be visible in at least the image data generated by one of the cameras.

In these cases, it may be possible to avoid detecting LED-blobs in image data of multiple cameras and rely on the single fisheye camera as the image data source. For example, using a single fisheye camera as the source of the image data may be used for tracking two or more controllers without reducing accuracy of the pose estimation and/or tracking. In some cases, the system may determine if a single image device may be used for tracking both of the hand-held controllers by determining a number of LEDs that are expected to be visible in the image data from each image device for each controller based at least in part on the controllers predicted or estimated pose. The system may then select a single image device if both controllers have at least the expected number of model points.

As an illustrative process, the system may, for each of the image devices of the headset device and for each of the controllers, project each of the model points of the model into image data generated by each of the image devices and count or determine the number of model points that are expected to be within the bounds of the image data. The system may also determine a distance (such as a maximum distance) between the visible LEDs and the camera center. Next, the system may determine a set of image devices for which the number of visible LEDs is the highest for all of the hand-held controllers in use. If the set of image devices is empty, then several cameras will be used to track the pose of the controllers. However, if the set includes two or more image devices, the system may select an image device from the set of image devices based at least in part on the distance for each controller of the set of controllers. For example, the system may select the image device having the smallest distance.

In other implementations, multiple image devices may be utilized for tracking the pose of individual hand-held controllers. For example, the system may utilize the image data from multiple image devices to improve the robustness and accuracy of the pose tracking. In some cases, using image data from multiple image devices may also reduce computation time and resource consumption. For example, the system may remove background clutter by estimating a depth of LED-blobs detected in the image data of a selected image device. For instance, the system may determine corresponding blobs in image data of two or more image devices and compute the estimated depth using, for example, a triangulation technique. The corresponding blob may be searched by image patch comparison along the epipolar line or by extracting LED-blobs on the image data of each of the multiple image devices. The system may then find the blob with the most similar size and intensity on the epipolar line. Then background blobs may be eliminated if the depth is greater than a threshold (such as a depth threshold based on a length of a human arm). Additionally, using multiple image devices may allow pose tracking using fewer detected model points. For instance, tracking a single constellation point or group may be used instead of tracking two model points or two groups of model points when determining a translation of the hand-held controller by triangulating a depth.

In some implementations, the system may utilize the multiple image devices to reduce the overall number of candidate poses for each of the groups of model points. For example, the system may detect a blob in the image data of a first image device that may match several compatible blobs present in the image data of a second image device, such as along an epipolar line. In this example, the system may utilize compatible associations as well as multiple candidate depth values for each blob based on the image data from the first and second image device. The system may then extend the set of inlier LEDs and compare the constellation point reprojection error to reduce the number of candidate poses.

In some cases, one or more controller may be lost (e.g., be moved out of view of the image devices of the headset device) during use. In these cases, the system may rely on predictions of the position and/or pose determined from the IMU data and the last visual-inertial state. The prediction tracking may be limited to a predetermined period of time (such as a number of seconds for which the prediction tracking remains accurate). At the time, the lost controller returns to the field of view of the image devices of the headset device, the system may realize the pose and the pose tracking, as discussed herein.

In the various examples above, the system may utilize the IM data, such as the acceleration, velocity, gravity vector, and the like to determine the pose of the hand-held controller. In some cases, the system may utilize an Extended Kalman Filter (EKF) to assist in estimating the pose of the controller, a velocity of the controller, and IMU biases, at a given timestamp. For example, each hand-held controller may be equipped with its own EKF that may be associated with one or more IMUs. In cases in which the controller has more than one IMU, the EKF successively processes the IMU data to determine relative pose constraints at a predetermined rate and integrates the IMU measurements independently for each IMU.

Before an initial pose measurement, the system is able to initialize the tilt of the controller (e.g., a gravity direction or vector) based at least in part on zero acceleration and IMU relative pose constraints. The system may then substantially continuously provide gravity direction or vectors and bias estimations based on integration of the IMU data and the constraints. In the case of a first pose, the system may fuse the first pose with the EKF gravity direction estimates. After the first pose, the EKF may smooth pose estimates and generate pose estimates between visual updates (e.g., pose determined using image data) based at least in part on IMU data from each controller. For example, the EFK may integrate IMU measurements to a pose measurement update at asynchronous times.

As an illustrative example, during initialization and without any previous pose estimates, the system may compute an initial estimate of a gravity direction in the controller frame and one or more gyro biases. For example, the system may assume that the controller has zero acceleration, non-zero angular velocity (gyro measurement are integrated), and that the relative pose between multiple IMUs are fixed. In some cases, a Ceres optimization technique used with the above assumptions and a short period of IMU data (such as two to five seconds). If the accelerometer variance is too high (e.g., above a threshold), the system rejects the initialization. However, if the system accepts the initialization, uncertainty covariances are extracted to assist in initializing the EKF covariance. In some cases, after the gravity initialization and until receiving the first pose, the EKF estimates gravity direction and biases based at least in part on EKF propagation. The EFK may also estimate gravity direction based at least in part as follows. The EFK may, at a predetermined rate, use the accelerometer data to compute a zero acceleration measurement (e.g., the accelerometer measurement is minus gravity in the IM frame with sensor bias and Gaussian noise). The system ensures smooth estimates by inflating Gaussian noise standard deviation of the EKF measurement if the variance of the accelerometer is larger than the variance measured when the controller is hovering or substantially stationary. Otherwise, the system computes a weight for the acceleration measurement based on Huber loss. As an alternative, the EKF, at the predefined rate, may use the known relative IMU poses (from multiple IMUs of the controller) as a measurement to align the IMU poses and adjust the remaining other estimated quantities where a Gaussian noise is injected in the measurement.

In some examples, between two updates, the EKF may integrate inertial measurements for each individual IMU. For instance, the pose, the velocity, and the quantities related to the computation of the EKF error-state covariance (e.g., Jacobian transition and noise propagation matrices) of each individual IMU may be integrated independently from the other IMU based on constant piecewise linear measurements. In some cases, prior to an update, a tightly-coupled transition matrix and tightly-coupled noise propagation matrix are computed based on the individual matrices of each individual IMU. The EKF covariance is then propagated with the tightly-coupled matrices. The individual matrices are reset to identity for the Jacobian transition matrix and zero for the noise propagation matrix. In some cases, each time the EKF receives a controller pose estimate, the EKF computes a pose measurement update in which orientation and position noise standard deviations are select by the controller.

In some examples, deep learning or one or more machine learned models or networks may be utilized to assist in pose estimation. For example, one or more deep neural networks may be used to compute the hand-held controller poses when controllers are not visible. The neural network reduces the drift of the controller pose compared to conventional IMU integration. In some examples, the neural network is used in addition to the EKF and directly learns to correct the EKF pose prediction by using IMU measurements and EKF states as inputs.

In one example, each individual hand-held controller may be associated with one neural network. Accordingly, if more than one controller is present, each controller is associated with its own neural network. The inputs of each neural network is the IMU data from the corresponding IMU without bias expressed in the world, EKF pose estimates where orientation is given as a quaternion, translation as a 3D vector, headset poses, and the time since the last visual update. The output of the neural network may be, for example, a pose correction expressed as a quaternion for the orientation and a 3D vector for the translation.

In some cases, the neural network may be trained using a computed pair of neural network input/output data (e.g., noisy IMU data, EKF estimates, ground truth data, and the like). During training, record sequences with the true controller and headset pose trajectories are generated. Then, for each sequence, GT poses and IMU measurement based on B-spline at high rate are computed. Noise may be added to the IMU measurement based on IMU datasheet or historical IMU data. The training may execute the EKF (without visual loss tracking) with different values of IMU deterministic, IMU bias, and scale factor errors. The training may then iterate for each epoch until the neural network has been trained. An EKF error may then be computed by simulating IMU fallback from an initial EKF state. Pose error may also be computed on the fallback moment. The neural network weights may then be updated based at least in part on the EKF error and the pose error.

As described herein, an exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like. In some cases, the system may also apply Gaussian blurs, Bayes Functions, color analyzing or processing technique and/or a combination thereof.

As discussed herein, the light source of the controller is groups of LEDs that may transition between at least two intensity states. However, it should be understood that any type of light source may be used instead of the LEDs. Additionally, in some implementing, the controllers may be equipped with retro-reflectors, lasers, or the like in lieu of or in addition to the LEDs.

In some cases, polarized filters may be associated with the image devices causing the image devices to selectively receive light from polarized sources. The polarized filters may also be configured in front of LEDs or retro-reflectors, with different rotations for each LED or reflector to, thereby, allow the image data to be used to estimate the rotation of each LED or reflector. As an illustrative example, a polarized light source may be used in conjunction to polarized retro-reflectors.

FIG. 1 illustrates an example physical environment 100 including a user 102 of virtual or mixed reality headset device 104 interacting with a first and second controllers 106(A) and 106(B). In some cases, the headset device 104 may be configured to use the pose of the controllers 106 as a user input or as part of a user input within the virtual environment. In these cases, the user 102 may point or otherwise position one or more of the controllers 106, such that the headset device 104 may perform one of a plurality of operations selected based on a determined pose of each individual controller 106.

For instance, in one specific example, the user 102 may point one or more of the controllers 106 at an object (e.g., a virtual object). The headset device 104 may first identify, based on detecting the pose of the controllers 106 and the visual data displayed to the user 104, that the user 104 is pointed at the object within the virtual environment. The headset device 104 may then perform an operation such as selecting, grabbing, moving, highlighting, or the like the object in response to determining that the user 102 has pointed the controllers 106 at the object. In this specific example, once the object is selected, the user 102 may transition one or more of the controllers 106 to a second pose, for instance, the user 102 may rotate the first controller 106(A) by 90 degrees. The headset device 104 may detect the change in pose or the second pose of the first controller 106(A) in a subsequent frame or image and interpret the second pose as a second user input and, in response, the headset device 104 may rotate the object 90 degrees within the virtual environment.

In some examples, as discussed herein, the headset device 104 is configured to allow the user 102 to actively engage with the virtual environment by physically interacting (e.g., moving, arranging, etc.) the objects within the virtual environment via the controllers 106 poses. Thus, the headset device 104 may select and perform operations within the virtual environment based on determined poses or changes in the pose of each of the controllers 106 individually as well as based on a combination of poses of the pair of controllers 106.

In order to detect the pose of the controllers 106, the headset device 104 may include one or more image components to capture images or frames of the physical environment 100 from substantially the perspective or view of the user 102 and/or the headset device 104. Thus, in some cases, the headset device 104 may capture the images or frames of the physical environment 100 based on a field of view, generally indicated by 108, substantially similar to a field of view of the headset device 104 and/or the user 102 when interacting directly with the physical environment 100.

In the illustrated example, the user 102 is interacting with the controllers 106 while the controllers 106 are within the field of vision 108 of the headset device 104. In this example, the controllers 106 may include model points, such as active LEDs discussed herein. The headset device 104 may capture at least one image or frame including data representative of the controllers 106. Within the image data, a number of model points may be visible and detected by the headset device 104. For example, the headset device 104 may perform operations associated with image point detection such as a applying a pixel regressor to determine sets or blobs of pixels within the image likely to contain an image point (e.g., a representation of the physical constellation point within the captured image). The headset device 104 may also perform suppression on image data during the image point detection to identify the positions or pixels corresponding to individual image points within each set of pixels.

In some cases, the headset device 104 may also perform classification or identification on the image points to determine, for instance, groups of LEDs (such as three or more LEDs), which may be used to limit the number of candidates that may be used to generate the pose of each controller 106 as well as to disambiguate the first controller 106(A) from the second controller 106(B), as discussed herein. Once, the image points are detected and the controllers 106 are classified, the headset device 104 may determine a pose of each controller 106 that may be used as the user input.

Figure 2:
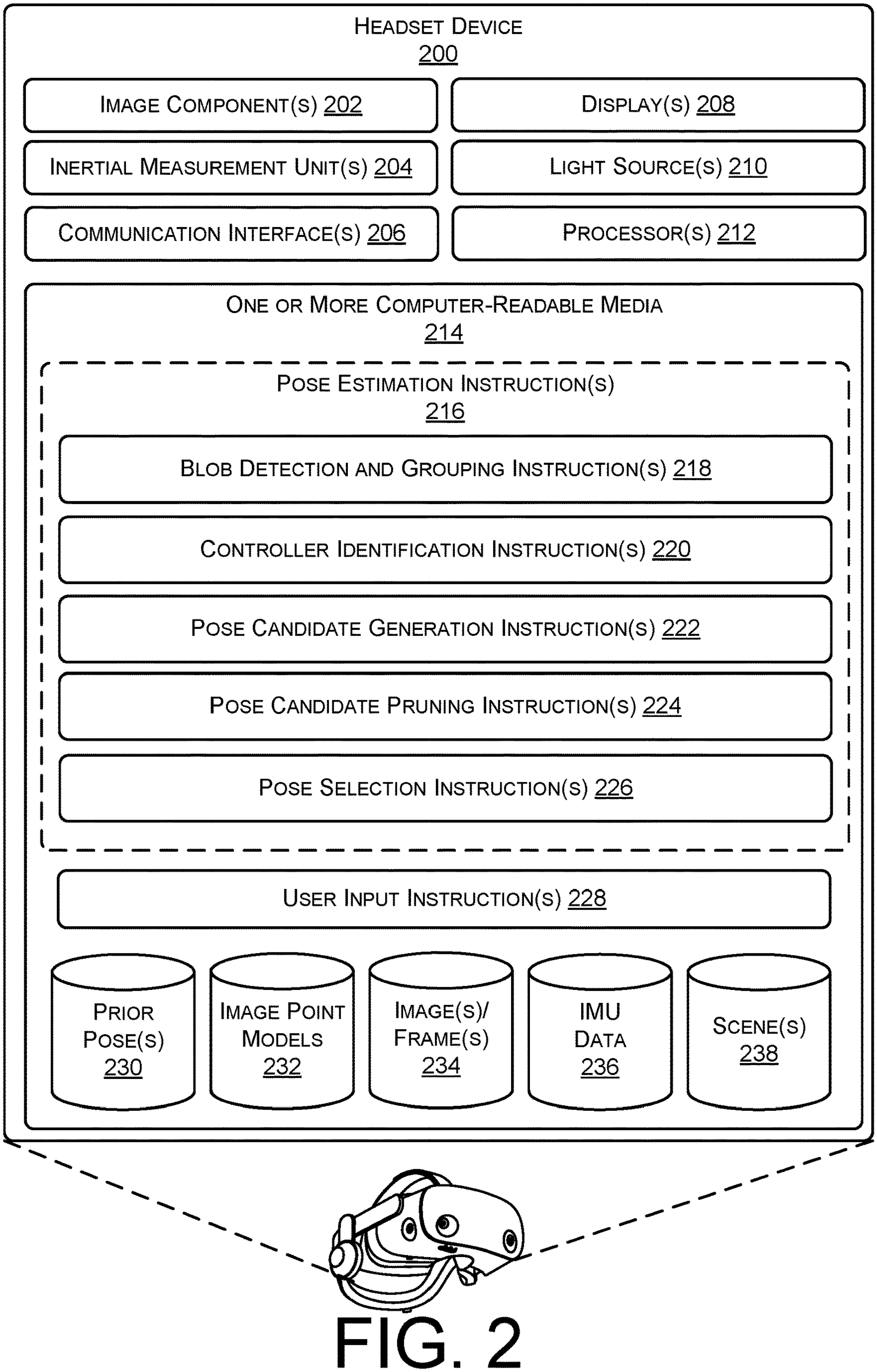
FIG. 2 is an example headset device according to some implementations.

FIG. 2 is an example headset device 200 according to some implementations. As described herein, a headset device 200 may include image components 202 for capturing visual data, such as image data or frames, from a physical environment. For example, the image components 202 may be positioned to capture multiple images from substantially the same perspective as the user (e.g., a position proximate the user's eyes or head) in order to incorporate the image data associated with the captured image into the virtual environment. The image components 202 may be of various sizes and quality, for instance, the image components 202 may include one or more wide screen cameras, 3D cameras, high definition cameras, video cameras, among other types of cameras. In general, the image components 202 may each include various components and/or attributes. As an illustrative example, the image component 202 may include a stereo image system that includes at least two color image devices a depth sensor. In some cases, the image components 202 may include one or more fisheye cameras or the like.

In some cases, the pose of an object may be determined with respect to a perspective of the headset device 200 and/or the user that may change as the headset device 200 and/or the user moves within the physical environment. Thus, the headset device 200 may include one or more IMUs 204 to determine the orientation data of the headset device 200 (e.g., acceleration, angular momentum, pitch, roll, yaw, etc. of the headset device 200).

The headset device 200 may also include one or more communication interfaces 206 configured to facilitate communication between one or more networks, one or more cloud-based management system, and/or one or more physical objects. The communication interfaces 206 may also facilitate communication between one or more wireless access points, a master device, and/or one or more other computing devices as part of an ad-hoc or home network system. The communication interfaces 206 may support both wired and wireless connections to various networks, such as cellular networks, radio, WiFi networks, short-range or near-field networks (e.g., Bluetooth®), infrared signals, local area networks, wide area networks, the Internet, and so forth. In some cases, the communication interfaces 206 may be configured to receive orientation data associated with the object from an object, such as the controllers 106 of FIG. 1. For example, the controllers 106 may also be equipped with IMUs and configured to send the captured IMU data of each controller 106 to the headset device 202 via the communication interfaces 206.

In the illustrated example, the headset device 202 also includes a display 208, such as a virtual environment display or a traditional 2D display. For instance, in one example, the display 208 may include a flat display surface combined with optical lenses configured to allow a user of the headset device 202 to view the display 200 in 3D, such as when viewing a virtual environment.

The headset device 202 may also include one or more light sources 210. In some cases, the light sources 210 may be configured to reflect off of retroreflective elements of a constellation associated with one or more controllers, as discussed herein. In some cases, the light sources 210 may be configured to activate according to a predetermined schedule, such as based on an exposure interval of the image components 202. In another example, the light source 210 may be an infrared illuminator. For example, in situations, in which the constellation on the controllers are formed via an infrared coating, the light sources 210 may be an infrared illuminator that activates in substantial synchronization with the image components 202. In these situations, the synchronization may allow the image components 202 to capture images within the infrared spectrum with a high degree of contrast resulting in image data for easier detection of image points.

The headset device 202 may also include one or more processors 212, such as at least one or more access components, control logic circuits, central processing units, or processors, as well as one or more computer-readable media 214 to perform the function associated with the virtual environment. Additionally, each of the processors 212 may itself comprise one or more processors or processing cores.

Depending on the configuration, the computer-readable media 214 may be an example of tangible non-transitory computer storage media and may include volatile and non-volatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 212.

Several modules such as instruction, data stores, and so forth may be stored within the computer-readable media 214 and configured to execute on the processors 212. For example, as illustrated, the computer-readable media 214 may store blob detection pose estimation instructions 216 and user input instructions 228 as well as data such as previous poses 230, image point models 232, image data and/or frames 234, IMU data 236, and/or scenes or virtual environment data 238. In some cases, the stored pose detection instructions 216 may also comprise additional instructions, such as blob detection and grouping instructions 218, controller identification instructions 220, pose candidate generation instructions 222, pose candidate pruning instructions 224, and pose selection instructions 226.

The blob detection and grouping instructions 218 may be configured to determine candidate LED locations or positions within image data or frames 234 by applying a thresholding or filtering. For example, the blob detection and grouping instructions 218 may remove or filter the image data such that only the bright areas remain for further processing. The blob detection and grouping instructions 218 may then apply a connected component extraction as well as shape filtering to determine blobs associated with the detected bright areas. In some cases, the blobs may be determined using IMU data 236 from the hand-held controllers, such as inertia data, circularity data, and the like. The headset device may then determine, for each blob, a location and a size.

Next, the blob detection and grouping instructions 218 may determine the identity of the blobs, such as during initialization. For example, each constellation point or LED point within the corresponding model may be assigned a unique identifier which may be used to limit or restrain the number of candidates poses based on the blobs detected. For instance, each candidate pose may include a number of image point to model point correspondence sets (e.g., two or four point 2D to 3D correspondences) that could represent the pose of a controller. In some cases, three or more identifications may be utilized to generate up to four candidate poses and a fourth identification may be used to disambiguate or select between the four candidate poses. Accordingly, during initialization, the blob detection and grouping instructions 218 may determine and/or assign the unique identifiers for each detected blob and corresponding LED.

In some implementations, such as when the user is in engaged with a single hand-held controller, the blob detection and grouping instructions 218 may determine the identity of the group of LEDs by first determining the two nearest neighbors of each LED in the model. The system may then for each LED in the model and for each candidate LED location (e.g., each blob) compute a first set of candidate blobs that are the nearest neighbors of a select candidate LED location. In some cases, the first set of candidate blobs may be two or more blobs, such as between three and four blobs per set per candidate LED location. The blob detection and grouping instructions 218 may then for each set of candidate blobs generate a second set of LEDs (such as a set of three LEDs) associations by paring a selected LED of the model with the selected candidate LED location (e.g., the model LED and corresponding blob) and the set of first candidate blobs (e.g., the nearest neighbors of the select candidate LED location).

The controller identification instructions 220 may be configured to determine the identity or disambiguate between multiple controllers based on the detected and/or identified LEDs, such as the sets of candidate blobs and/or LEDs. For example, the controller identification instructions 220 may utilize a bit sequence for multiple groups of LEDs assigned to a controller and intensities of detected LEDs to determine the identity of each controller and thereby disambiguate between the multiple controllers, as discussed herein.

The pose candidate generation instructions 222 may be configured to, for each set of associations, generate candidate poses based at least in part on a P3P technique.

The pose candidate pruning instructions 224 may be configured to reject or eliminate candidate poses. For example, the pose candidate pruning instructions 224 may remove any candidate poses that are not compatible with a gravity estimate based on the IM data 236 of the associated hand-held controller. For instance, the pose candidate pruning instructions 224 may apply a threshold to a difference between an angle of the estimated gravity vector and the angle of the controller represented by the candidate pose.

In another example, the pose candidate pruning instructions 224 may determine if a candidate pose is compatible with the other LEDs by comparing a normal of the other LED with a vector from the LED to the image device or camera center. For instance, the LED is compatible if a difference of the normal and the vector is within a threshold angle. As another example, the pose candidate pruning instructions 224 may determine if a candidate pose is compatible with the other LEDs, if the hand-held controller geometry determined from the IMU data 236 is in alignment with LEDs of the controller that are occluded by the controller itself. For instance, the pose candidate pruning instructions 224 may determine if a normal of the occluded LED passes an occlusion check by applying a ray casting approach and determine if the LED passes or fails an occlusion test.

The pose selection instructions 226 may, for each of the remaining candidate poses, extend the second set of LEDs by reprojecting the other LEDs of the controller model (e.g., the LEDs not associated with the second set of LEDs) and associating the reprojected LEDs to the closest blob in the image data 234 captured by the headset device. The pose selection instructions 226 may accept an association between the model LED and the closest blob in the image data when, for example, a distance between the LED and the closet blob is less than a predetermined pixel threshold. For example, 10 pixels may be used as a threshold for a 960×960 image. Accordingly, the pixel threshold may be selected based on a resolution or quality of the image device and/or size of the image data captured by the headset device. In some cases, the pixel threshold may be adjusted as a function of the expected distance between the hand-held controller and the image device (or headset device), as the distance between the LEDs represented as blobs in the image data decreases as the controller is moved further from the image device (or headset device).

The pose selection instructions 226 may also, for each remaining candidate pose, refine each remaining candidate pose using a perspective-n-points (PnP) technique on the extended set of associations (e.g., the second set of LEDs plus the other LEDs). In some cases, a robust cost function, such as Huber loss or Tukey loss, may be applied to remove LED outliers from the extended set of associations. The pose selection instructions 226 may then select the candidate pose that has the largest number of associations and the lowest average reprojection error. In some examples, the headset device may only accept a candidate pose if these largest number of associations is above an association threshold and the lowest average reprojection error is below an error threshold.

The user input instructions 228 may be configured to receive one or more poses of one or more controllers identified by the pose selection instructions 226 and to perform various operations based on the pose and/or the object. For instance, the user input instructions 228 may be configured to use the pose of the one or more controllers as a user input to select or manipulate items or objects within the virtual environment.

Figure 3:
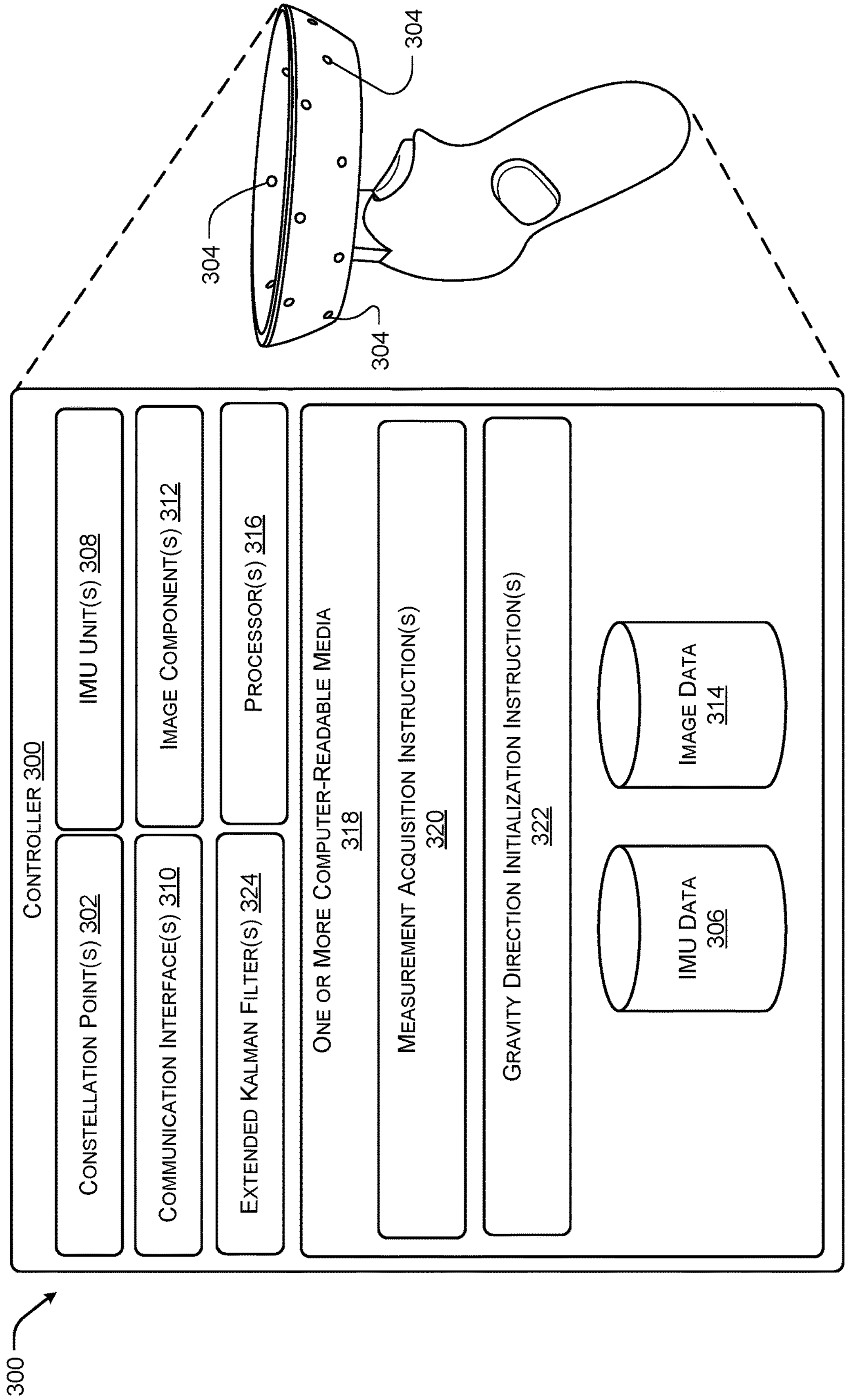
FIG. 3 is an example hand-held controller device according to some implementations.

FIG. 3 is an example hand-held controller 300 according to some implementations. In the current example, the controller 300 is a controller that may be used as one unit of a pair of controllers to provide user inputs to a virtual reality system. In some cases, the pose of the controller 300 may at least in part be used as the control input. For example, the user may point the controller 300 at an article within the virtual environment to cause the virtual reality system to select, manipulate, or interact with the article.

In the current example and as discussed above, the image system may be configured to utilize the pose of the controller 300 as a control input and/or user input. In order to determine the pose of the controller 300, a headset device may include an image component to capture image data of the controller 300 that may be processed to identify image points corresponding to model points 302 on the exterior of the controller 300. For instance, in the illustrated example, the model points 302 may be formed from LED lights, generally indicated by LED lights 304. In general, the LEDs 304 from the constellation on the controller 300 and may be detected within image data captured by the headset device or other image device of the image system.

As discussed above, in some cases, the image system may utilize IM data 306 associated with one or more of the controllers 300 to determine the pose of the controller 300. In these cases, the controller 300 may be equipped with one or more IMU units 308 and one or more communication interfaces 310. The IMU units 308 may be configured to generate or collect data (e.g., the IMU data 306) associated with the movement and pose of the controller 300, such as acceleration data, angular momentum data, pitch data, roll data, yaw data, gravity data, and the like. In one example, the IMU units 308 may include one or more accelerometers, one or more gyroscopes, one or more magnetometers, and/or one or more pressure sensors, as well as other sensors. In one particular example, the IMU units 308 may include three accelerometers placed orthogonal to each other, three rate gyroscopes placed orthogonal to each other, three magnetometers placed orthogonal to each other, and a barometric pressure sensor. In some cases, the controller 300 may be configured to stream or substantially continuously send the IMU data 306 from the IMU units 308 to the headset device via the communication interface 310.

The one or more communication interfaces 310 may be configured to facilitate communication between one or more networks, one or more cloud-based system, and/or one or more other devices, such as a headset device. The communication interfaces 310 may also facilitate communication between one or more wireless access points, a master device, and/or one or more other computing devices as part of an ad-hoc or home network system. The communication interfaces 310 may support both wired and wireless connection to various networks, such as cellular networks, radio, WiFi networks, short-range or near-field networks (e.g., Bluetooth®), infrared signals, local area networks, wide area networks, the Internet, and so forth.

The controller 300 may also include one or more image components 312. The image components 312 may be of various sizes and quality, for instance, the image components 312 may include one or more wide screen cameras, 3D cameras, high definition cameras, video cameras, monochromic, fisheye, infrared, among other types of cameras. In general, the image components 312 may each include various components and/or attributes. In one specific example, the image components 312 may be configured to capture image data 314 of the physical environment and a second controller, such as when the user is engaged with a pair of controllers. In some cases, the controller 300 may stream or otherwise send the image data 314 to the headset device with the IMU data 306 to assist in determining the pose of the controller 300.

The controller 300 may also include one or more EKF(s) 324 that may be configured to assist in estimating the pose of the controller 300, a velocity of the controller 300, and IMU biases, at a given timestamp. For example, each hand-held controller 300 may be equipped with its own EKF 324 that may be associated with one or more IMU units 308. In cases in which the controller 300 has more than one IMU units 308, the EKF 324 may be configured to successively processes the IMU data 306 from each of the IMU units 308 to determine relative pose constraints at a predetermined rate and integrate the IMU data 306 independently for each IMU unit 308.

The controller 300 may also include one or more processors 316, such as at least one or more access components, control logic circuits, central processing units, or processors, as well as one or more computer-readable media 318 to perform the function associated with the virtual environment. Additionally, each of the processors 316 may itself comprise one or more processors or processing cores.

Depending on the configuration, the computer-readable media 318 may be an example of tangible non-transitory computer storage media and may include volatile and nonvolatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 316.

Several modules such as instruction, data stores, and so forth may be stored within the computer-readable media 318 and configured to execute on the processors 316. For example, as illustrated, the computer-readable media 318 may store measurement acquisition instructions 320 and gravity direction initialization instructions 322 as well as the IMU data 306 and/or the image data 314.

In one example, the measurement acquisition instructions 320 may be executed by the processor 316 to cause the processor 316 to perform operations associated processing, pre-processing, organizing, arranging, packaging, and the like the IMU data 306 for sending to the headset device. For instance, in this example, the measurement acquisition instructions 320 may assist with the processing of the IMU data 306, such as to compress the IMU data 306 prior to transmission by the communication interfaces 310.

The gravity direction initialization instructions 322 may be configured to initialize the tilt of the controller 300 (e.g., a gravity direction or vector) based at least in part on zero acceleration and IMU relative pose constraints (such as those determined with respect to the EKF 324). The gravity direction initialization instructions 322 may then substantially continuously provide gravity direction or vectors and bias estimations based on integration of the IMU data 308 and the constraints. In the case of a first pose, the gravity direction initialization instructions 322 may fuse the first pose with the EKF gravity direction estimates.

FIGS. 4-8 are flow diagrams illustrating example processes associated with determining a pose of a controller or pair of controllers according to some implementations. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

Figure 4:
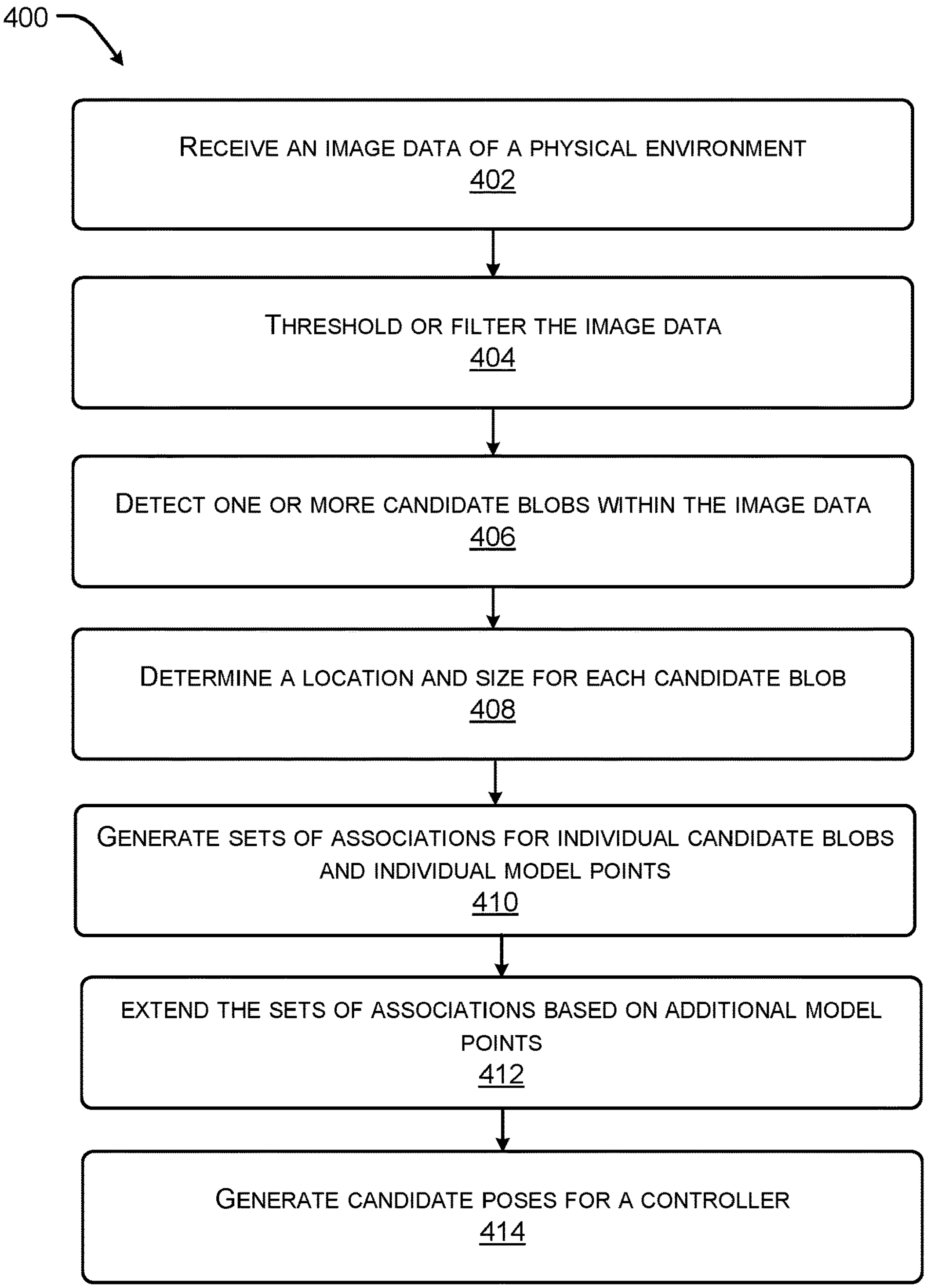
FIG. 4 is an example flow diagram showing an illustrative process for determining a pose of one or more controllers according to some implementations.

FIG. 4 is an example flow diagram showing an illustrative process 400 for determining a pose of a controller according to some implementations. As discussed above, described herein is a virtual or mixed reality system that may be configured to determine a pose of a controller or pair of controllers based at least in part on image data captured from a perspective of a headset device. For example, each controller may be marked with a predetermined pattern or constellation of LEDs and the image data may represent a 2D or 3D representation of the constellation that may be used in conjunction with a model to determine an identity of an LED, a group of LEDs, and/or disambiguate the identity of each controller.

At 402, a system, such as a headset device, may receive image data from one or more image devices. The image data may include data representing one or more hand-held controllers currently in use by a user of a virtual or mixed reality system. In some cases, the image data may be captured by a red-green-blue camera, a monochrome camera, a fisheye camera, a stereo camera pair, a depth sensor, a near-visible camera, an infrared camera, a combination thereof, or the like.

At 404, the system may threshold or filter the image data. For example, the system may remove or filter the image data such that only the bright areas remain for further processing.

At 406, the system may detect one or more candidate blobs within the image data. For example, the system may determine blobs within the filtered image data associated with the bright areas or portions. In some cases, the system may apply a connected component extraction as well as shape filtering to determine blobs associated with the detected bright areas. In some cases, the blobs may be determined using IMU data from the hand-held controllers, such as inertia data, circularity data, and the like.

At 408, the system may determine, for each candidate blob, a location and a size. For example, the system may determine pixels of the image data associated with the blob, such as via a classification using one or more machine learned models, networks, or the like.

At 410, the system may generate sets of associations for the individual candidate blobs and individual model points of a model of the LEDs on the controller. As an example, the system may, for each candidate blob, generate a set of candidate blob associations by paring a selected model point of the model with the selected candidate blob location and the candidate blobs (e.g., the nearest neighbors of the select selected blob location). For example, the sets of associations may be formed based on a nearest neighbor or physical proximity in physical space. Thus, physically proximate blobs represented in the image data on the hand-held controller may form a group or neighboring clique which may be associated with the corresponding model points. In some implementations, the system may determine the identity of the group of blobs by first determining the two nearest neighbors of each model point in a stored model of the controller. The system may then, for each model point in the model and for each candidate blob location, compute sets of associations including a select candidate blob. In some cases, the sets of associations may include three or more blobs.

At 412, the system may extend the sets of associations based on additional model points to blob correspondences. For example, the system may select a next nearest neighbor in the model and determine if a corresponding blob exists within the image data. if so the associations may be added to the set of associations for each selected point. At 414, the system may generate candidate poses for the controller. For example, for each set of association, the system may generate up to four candidate poses based at least in part on a P3P technique. In some cases, only sets of associations having greater than an association threshold and less than a reprojection error may be utilized to generate candidate poses, as discussed above.

Figure 5:
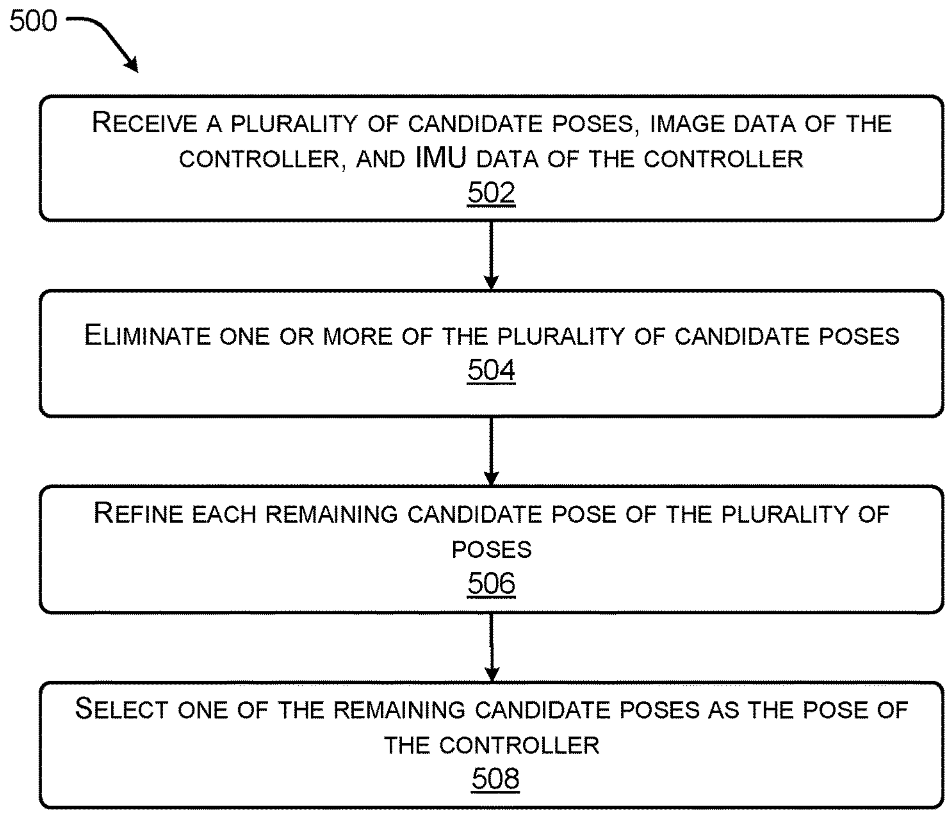
FIG. 5 is an example flow diagram showing an illustrative process for pruning candidate poses of a controller according to some implementations.

FIG. 5 is an example flow diagram showing an illustrative process 500 for pruning candidate poses of a controller according to some implementations. As discussed above, described herein is a virtual reality system that may be configured to determine a pose of a controller or pair of controllers based at least in part on image data captured from a perspective of a headset device. For example, each controller may be marked with a predetermined pattern or constellation of LEDs and the image data may represent a 2D or 3D representation of the constellation that may be used in conjunction with a model to determine an identity of an LED, a group of LEDs, and/or disambiguate the identity of each controller.

At 502, the system may receive a plurality of candidate poses, image data of the controller, and IMU data of the controller. For example, the candidate poses may be determined as discussed above with respect to process 400 of FIG. 4. The IMU data may be reached from one or more IMU devices of the controller.

At 504, the system may eliminate candidate poses. For example, the system may remove any candidate pose that is not compatible with a gravity estimate based on the IMU data of the hand-held controller. For instance, the system may apply a threshold between a difference between an angle of the estimated gravity vector and the angle of the controller represented by the candidate pose. For each of the remaining candidate poses, the system may extend the set of candidate blobs by reprojecting the other model points of the controller model (e.g., the LEDs on the controller not associated with the set of blobs) and associating the reprojected model points to the closest blob in the image data. The system may accept an association between the model constellation point and the closest blob in the image data when, for example, a distance between the constellation point and the closet blob is less than a predetermined pixel threshold.

In another example, the system may determine if a candidate pose is compatible with the other model points of the model by comparing a normal of the other model points with a vector from the corresponding blob to the image device or camera center. For instance, the constellation point is compatible if a difference of the normal and the vector is within a threshold angle. As another example, the system may determine if a candidate pose is compatible with the other model points of the model, if the hand-held controller geometry determined from the IMU data is in alignment with model points of the controller that are occluded by the controller itself. For instance, the system may determine if a normal of the occluded constellation point passes an occlusion check by applying a ray casting approach and determine if the constellation point passes or fails an occlusion test.

At 506, the system may refine each remaining candidate pose of the plurality of poses. For example, if multiple candidate poses remain after elimination, the system may, for each remaining candidate pose, refine each remaining candidate pose using a PnP technique on the extended set of associations (e.g., the set of associations for each set of candidate blobs plus the other model points). In some cases, a robust cost function, such as Huber loss or Tukey loss, may be applied to remove model points outliers from the extended set of associations.

At 508, the system may select the one of the remaining candidate poses as the pose of the controller. For example, the system may select the candidate pose that has the largest number of associations and the lowest average reprojection error. In some examples, the system may only accept a candidate pose as the controller pose if these largest number of associations is above an association threshold and the lowest average reprojection error is below an error threshold.

Figure 6:
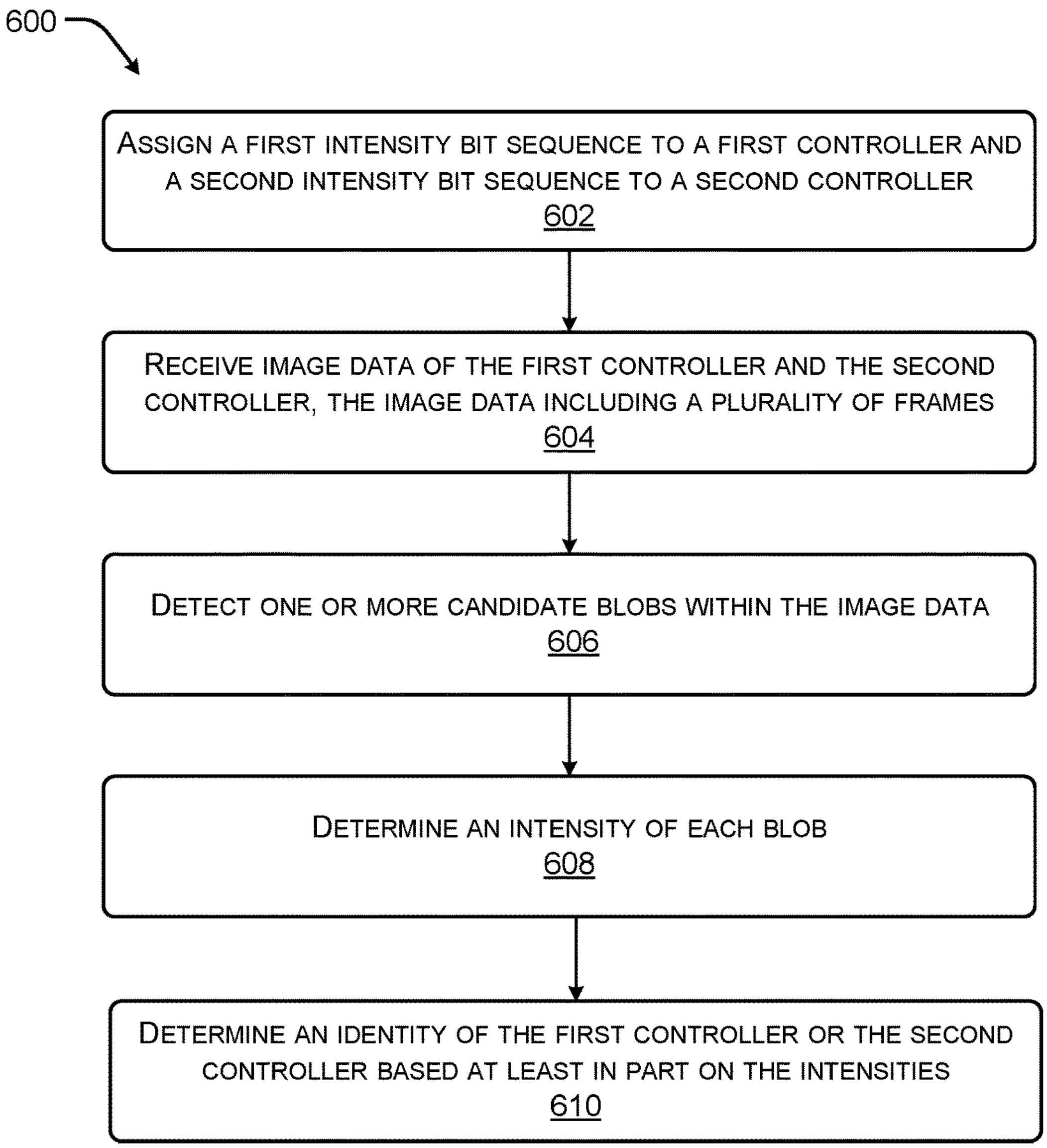
FIG. 6 is an example flow diagram showing an illustrative process for disambiguating between multiple controllers of a virtual reality system according to some implementations.

FIG. 6 is an example flow diagram showing an illustrative process 600 for disambiguating between multiple controllers of a virtual reality system according to some implementations. As discussed above, described herein is a virtual reality system may be configured to determine a pose of a controller or pair of controllers based at least in part on image data captured from a perspective of a headset device. In some cases, the user may be engaged with a pair of controllers which the system may need to disambiguate or determine an identity of prior to using the poses as user inputs.

At 602, the system may assign a first intensity bit sequence to a first controller and a second intensity bit sequence to a second controller. The intensity bit sequences may cause an LED intensity component of each controller to adjust the intensity of individual groups of LEDs over predefined periods of time to generate a unique binary sequence represented by the bit sequence for each group of model points that may be encoded by mapping each intensity state to a bit. For instance, as one example, the sequence of intensities High, Low, Low, High could correspond to a bit sequence 1001 if the High intensity state is 1 and the Low intensity state is 0.

At 604, a system may receive image data including the first controller and the second controller. The image data may include a plurality of frames. In some cases, the image data may be captured by a red-green-blue camera, a monochrome camera, a fisheye camera, a stereo camera pair, a depth sensor, a near-visible camera, an infrared camera, a combination thereof, or the like. In some implementations, the system may toggle or alternate between frame for processing the pose of each controller. Accordingly, each adjacent frame of the image data may be used to represent a different hand-held controller.

At 606, the system may detect one or more candidate blobs within the image data. For example, the system may determine blobs within the filtered image data associated with the bright areas or portions. In some cases, the system may apply a connected component extraction as well as shape filtering to determine blobs associated with the detected bright areas. In some cases, the blobs may be determined using IMU data from the hand-held controllers, such as inertia data, circularity data, and the like.

At 608, the system may determine an intensity of each blob representing an LED of a controller in the image data over the predetermined period of time (e.g., a number of frames). For example, the system may determine if an intensity of a blob has changed from high to low or from low to high based on an intensity difference threshold and the intensity assigned during the prior frame. For instance, the system may determine if the intensity of the blob in the current frame is higher, lower, or remained the same as the intensity of the blob in the prior frame. These changes may be detected by an intensity threshold based at least in part on a relative average image intensity in the blob or based at least in part on relative size of the blob.

At 610, the system may determine an identity of the first controller or the second controller based at least in part on the intensities. For example, the system may compare the detected sequence of intensities over a predetermine number of frames the first intensity bit sequence and/or the second intensity bit sequence. The identification may be accepted if one of the intensity bit sequences is identical or if the Hamming distance to the detected intensity sequence is low enough (e.g., within a distance threshold). For example, if the distance is less than or equal to the distance threshold (such as 1 or 2 bits), the identification may be accepted.

Figure 7:
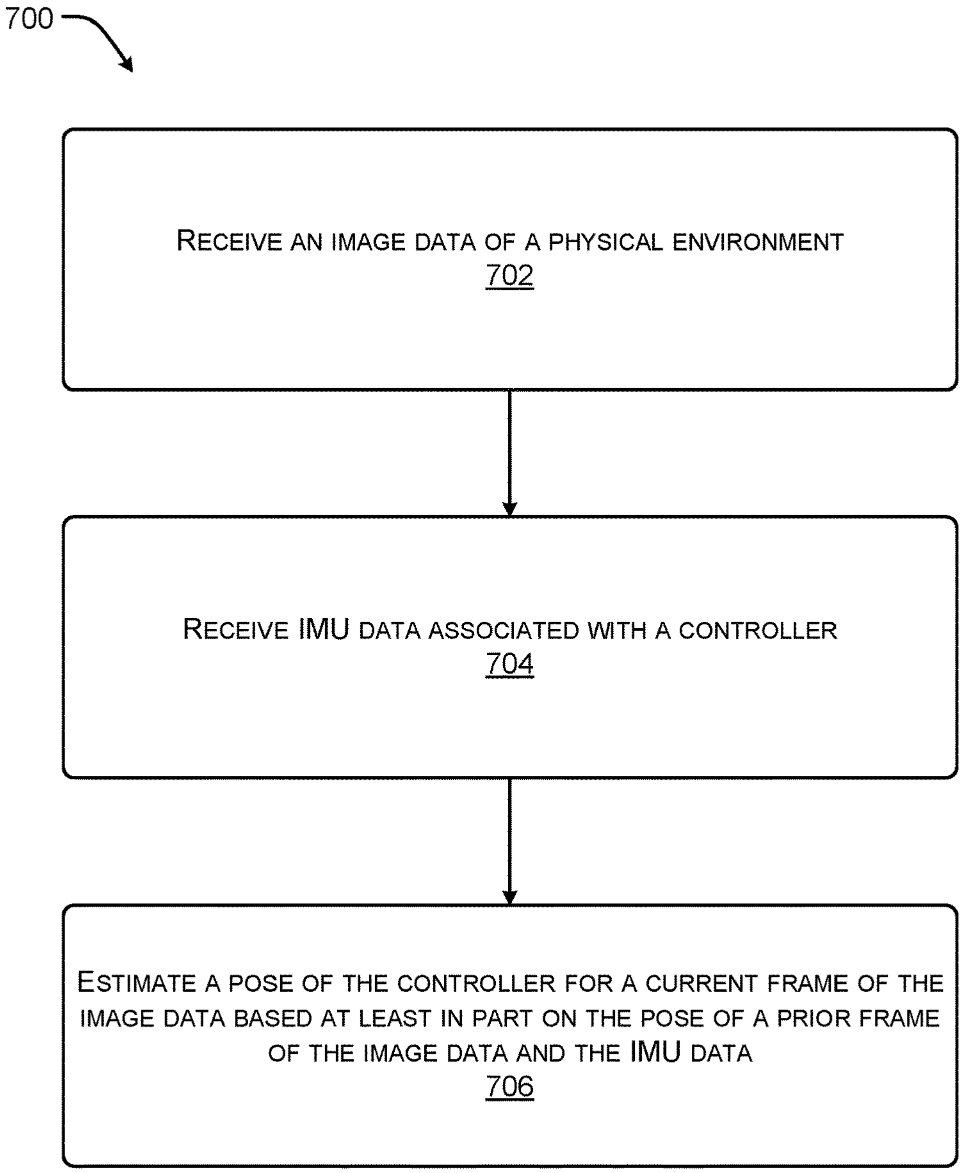
FIG. 7 is an example flow diagram showing an illustrative process for tracking controllers of a virtual reality system according to some implementations.

FIG. 7 is an example flow diagram showing an illustrative process 700 for tracking controllers of a virtual reality system according to some implementations. As discussed above, described herein is a virtual reality system that may be configured to determine a pose of a controller or pair of controllers based at least in part on image data captured from a perspective of a headset device. Once an initial pose and identity of a controller is determined, the system may track the pose of each controller.

At 702, the system may receive image data from one or more image devices of the physical environment. The image data may include data representing one or more hand-held controllers currently in use by a user of a virtual reality system. In some cases, the image data may be captured by a red-green-blue camera, a monochrome camera, a fisheye camera, a stereo camera pair, a depth sensor, a near-visible camera, an infrared camera, a combination thereof, or the like.

At 704, the system may receive IM data associated with the controller. For example, the controller may stream or otherwise wirelessly send the IMU data from the controller to the system. The IMU data may include acceleration, gravity vectors, angular momentum, rotation data, pitch, roll, yaw, and the like.

At 706, the system may estimate a pose in a current frame of the image data based at least in part on the pose of the prior frame and the IMU data. For instance, the system may generate a prediction of the controller pose based at least in part on a visual-inertial state for the current frame by combining the visual estimates determined using the image data with the IMU data or samples. In some cases, the system may consider the orientation from the IMU data and estimate at least one translation. For example, the translation may be determined using two LED blob associations and a P2P technique.

As an illustrative example, the system track the pose of the controller by first computing a predicted translation and orientation from the visual-inertial state. The headset may then, for each controller constellation point of the model and for each candidate blob location in the current frame of the image data, check if the constellation point normal is compatible with the prediction viewpoint, check if the projected constellation point location is close-enough (e.g., within a threshold pixel distance) from the blob location, and add the association to the candidate set of associations if both checks are passed. Next, for each distinct pair of validated associations, the system may estimate a pose candidate. For each candidate pose, the system may generate an orientation based at least in part on the IMU data. Using the orientation, the system may estimate the translation based at least in part on minimizing the point-to-line distance of the two model points in the controller model with each's respective camera ray determined from the camera center to the blob location. Once the set of candidate poses have been computed, the system may select one of the candidate poses as discussed above with respect to FIG. 4.

Figure 8:
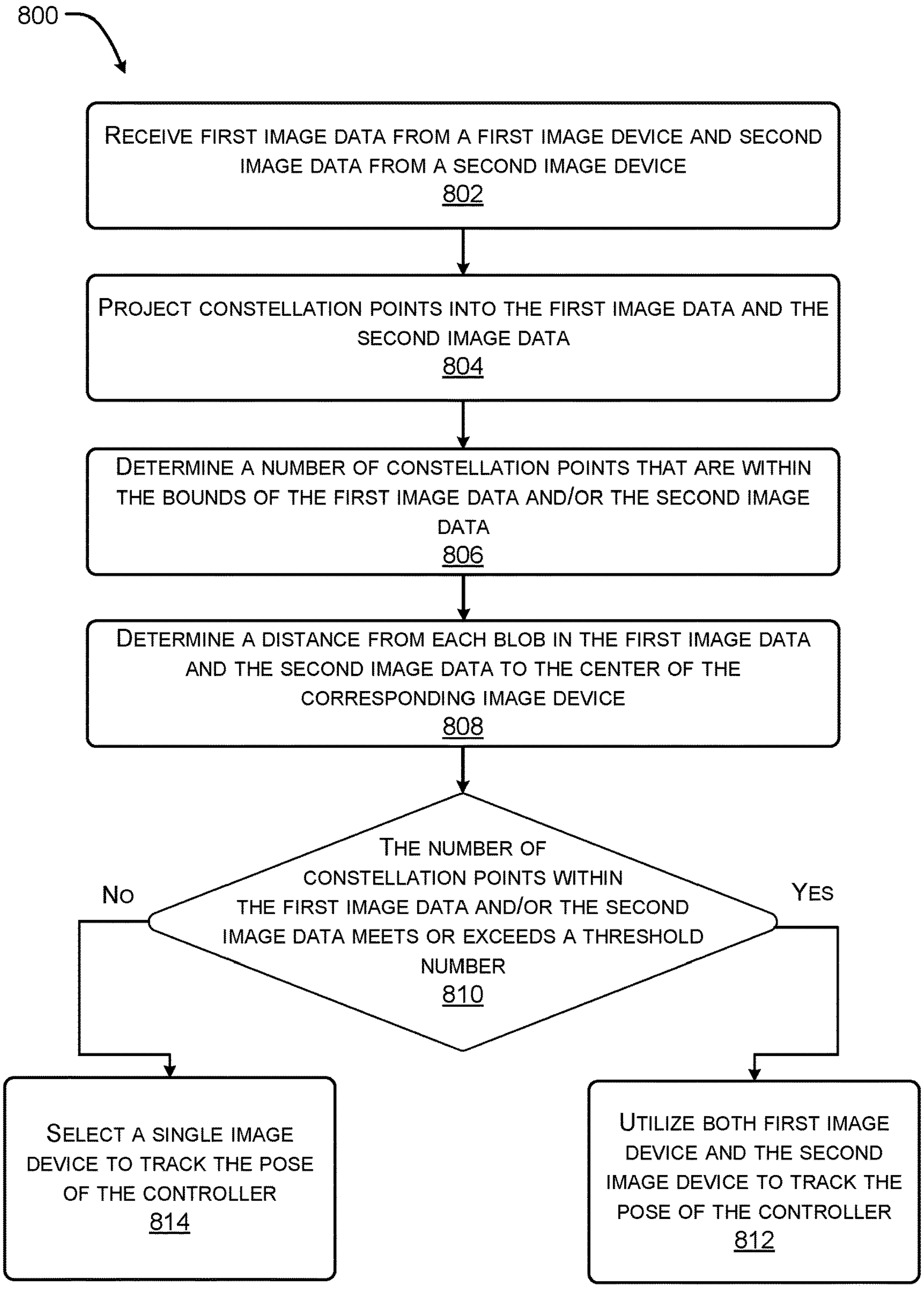
FIG. 8 is an example flow diagram showing an illustrative process for selecting an image device for tracking controller pose according to some implementations.

FIG. 8 is an example flow diagram showing an illustrative process 800 for selecting an image device for tracking controller pose according to some implementations. As discussed above, described herein is a virtual reality system that may be configured to determine a pose of a controller or pair of controllers based at least in part on image data captured from a perspective of a headset device. For example, the system may determine which of a first image device and/or a second image device to use in determining and/or tracking the pose of each of the hand-held controller. For instance, in many cases, only a single image device is required to track poses of a controller. However, when the headset has multiple image devices (e.g., a stereo image system), the image data from the multiple image devices may be used to extend the field of view and reduce visual losses. In some cases, with image data from multiple image devices being used to track a pose, the headset device may need to avoid doubling the blobs during extraction by running extraction and/or identification on both sets of image data independently.

At 802, the system may receive first image data from a first image device and a second image data from a second image device. For example, the first image data and the second image data may be received from a pair of stereo image devices. In some cases, the first image data and/or the second image data may include data representative of a hand-held controller.

At 804, the system may for each of the first image device and the second image device, project each of the model points of the model into the first image data and/or the second image data.

At 806, the system may count or otherwise determine the number of model points that are within the bounds of the first image data and/or the second image data.

At 808, the system may determine a distance (such as a maximum distance) between the visible blobs and the center of the first image device and/or the second image device.

At 810, the system may determine if the number of model points within either the first image data and/or the second image data meets or exceeds a threshold number. If neither the number of model points in the first image data nor the second image data meets or exceeds the threshold number, the process 800 may advance to 812 and the system may unitize both the first and second image devices to track the pose of the controller. However, if either or both of the image data has a number of model points that meets or exceeds the threshold number, the process 800 may proceed to 814.

At 814, the system may select a single image device to track the pose of the controller. If both the first image data and the second image data meets or exceeds the threshold number, the system may select an image device from the set of image devices based at least in part on the distance to the camera center. Otherwise, the system selects the image devices meeting and/or exceeding the threshold number.

Figure 9:
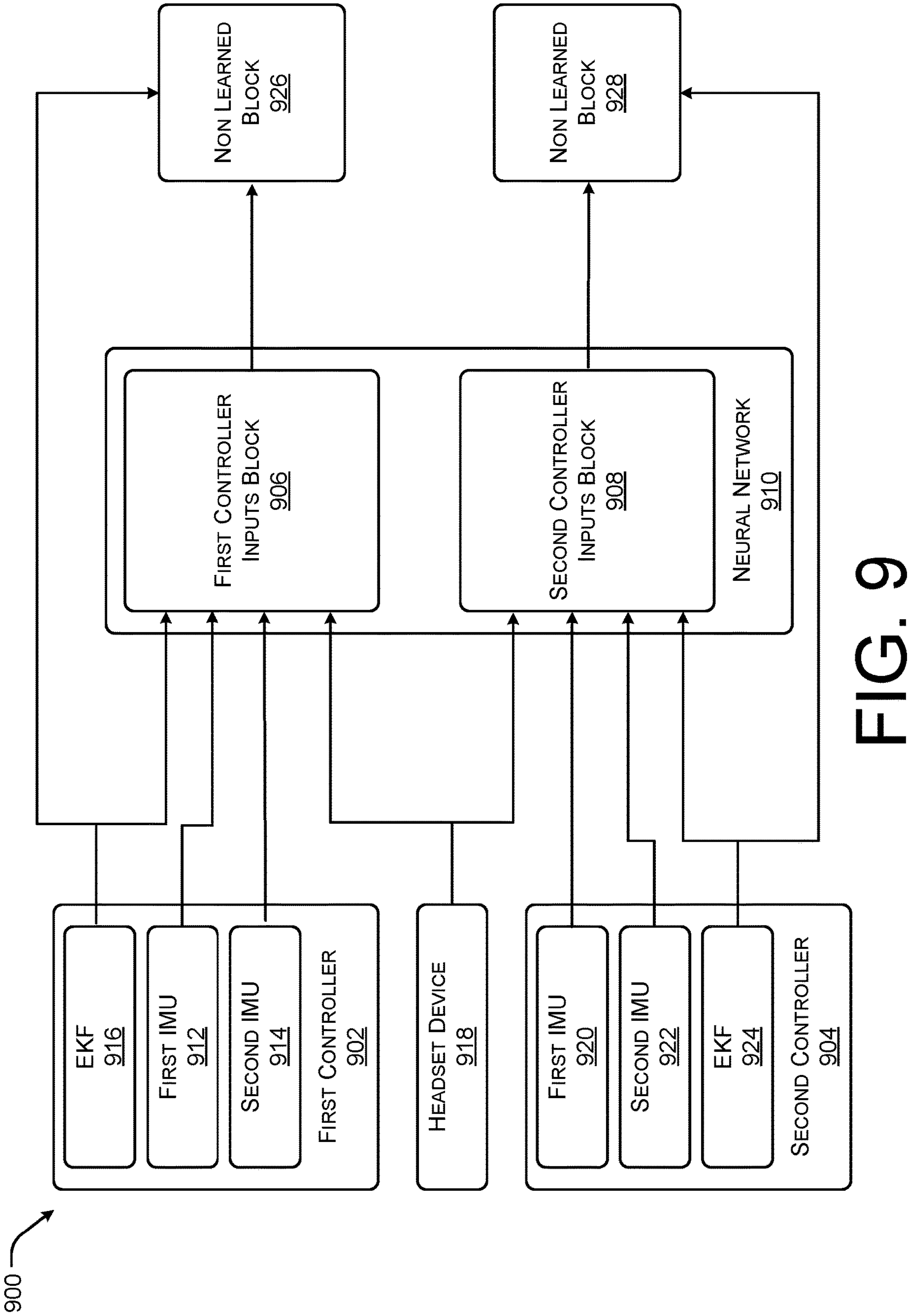
FIG. 9 is an example block diagram of a system to determine a pose of a pair of hand-held controllers according to some implementations.

FIG. 9 is an example block diagram of a system 900 to determine a pose of a pair of hand-held controllers 902 and 904 according to some implementations. In the current example, a user may be engaged with a virtual or mixed reality system including a first controller 902, a second controller 904, and a headset device 918. As discussed above, the pose of the first and second controllers 902 and 904 may be used as user inputs to the virtual or mixed reality system.

In the current example, each of the controllers 902 and 904 are associated with an independent or assigned block 906 and 908, respectively, of the neural network 910. The first controller inputs block 906 of the neural network 910 may receive as inputs IMU data (e.g., gyroscope data and acceleration data) from a first IMU 912 and a second IMU 914 of the first controller 902. The first controller inputs block 906 of the neural network 910 may also receive an EKF pose estimate and time since a last visual update (such as when the controller 902 is moved outside a field of view of the headset device 918) as an input from the EKF 916 of the first controller 902. The headset device 918 may also provide, as an input, image data and/or a pose of the first controller 902 determined from the image data to the first controller inputs block 906 of the neural network 910. Likewise, the second controller inputs block 908 may receive IMU data (e.g., gyroscope data and acceleration data) from a first IMU 920 and a second IMU 922 of the second controller 904 as well as the image data and/or pose of the second controller 904 from the headset dev ice 918 and an EKF pose estimate and time since a last visual update from the EKF 924 of the first controller 902.

The output of the first controller inputs block 906 and the second first controller inputs block 908 may be a pose correction for each of the poses determined via the image data of the headset device 918, as discussed herein. In some cases, the pose correction may be expressed as a quaternion for the orientation and a 3D vector for the translation of each controller 902 and 904. In the current example, a first and second non-learned block 926 and 928, respectively, may apply the pose correction to pose generated by the EKF 916 and 924.

Figure 10:
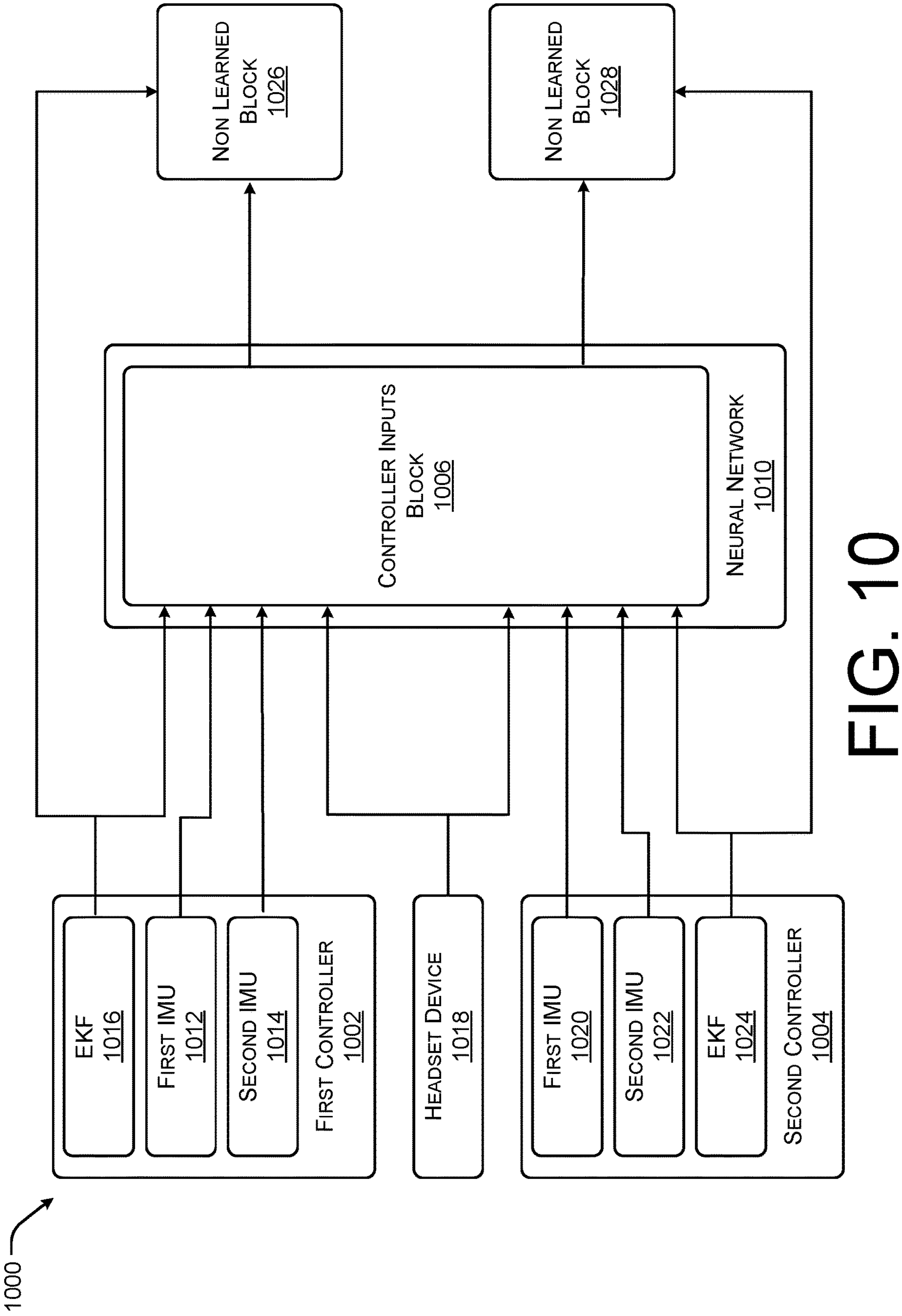
FIG. 10 is another example block diagram of a system to determine a pose of a pair of hand-held controllers according to some implementations.

FIG. 10 is another example block diagram of a system 1000 to determine a pose of a pair of hand-held controllers 1002 and 1004 according to some implementations. As discussed above, a user may be engaged with a virtual or mixed reality system including a first controller 1002, a second controller 1004, and a headset device 1018. As discussed above, the pose of the first and second controllers 1002 and 1004 may be used as user inputs to the virtual or mixed reality system.

In the current example, each of the controllers 1002 and 1004 are associated with a single block 1006 of the neural network 1010. The controller inputs block 1006 of the neural network 1010 may receive as inputs IMU data (e.g., gyroscope data and acceleration data) from a first IMU 1012 and a second IMU 1014 of the first controller 1002 and IMU data (e.g., gyroscope data and acceleration data) from a first IMU 1020 and a second IMU 1022 of the second controller 1004. The controller inputs block 1006 of the neural network 1010 may also receive an EKF pose estimate and time since a last visual update (such as when either of the controllers 1002 and/or 1004 are moved outside a field of view of the headset device 1018) as an input from the EKF 1016 of the first controller 1002 and the EKF 1024 of the second controller 1004. The headset device 1018 may also provide, as an input, image data and/or a pose of the first controller 1002 and/or the second controller 1004 determined from the image data to the controller inputs block 1006 of the neural network 1010.

The output of the controller inputs block 1006 may be a pose correction for each of the poses determined via the image data of the headset device 1018, as discussed herein. In some cases, the pose correction may be expressed as a quaternion for the orientation and a 3D vector for the translation of each controller 1002 and 1004. In the current example, a first and second non-learned block 1026 and 1028, respectively, may apply the pose correction to pose generated by the EKF 1016 and 1024.

Figure 11:
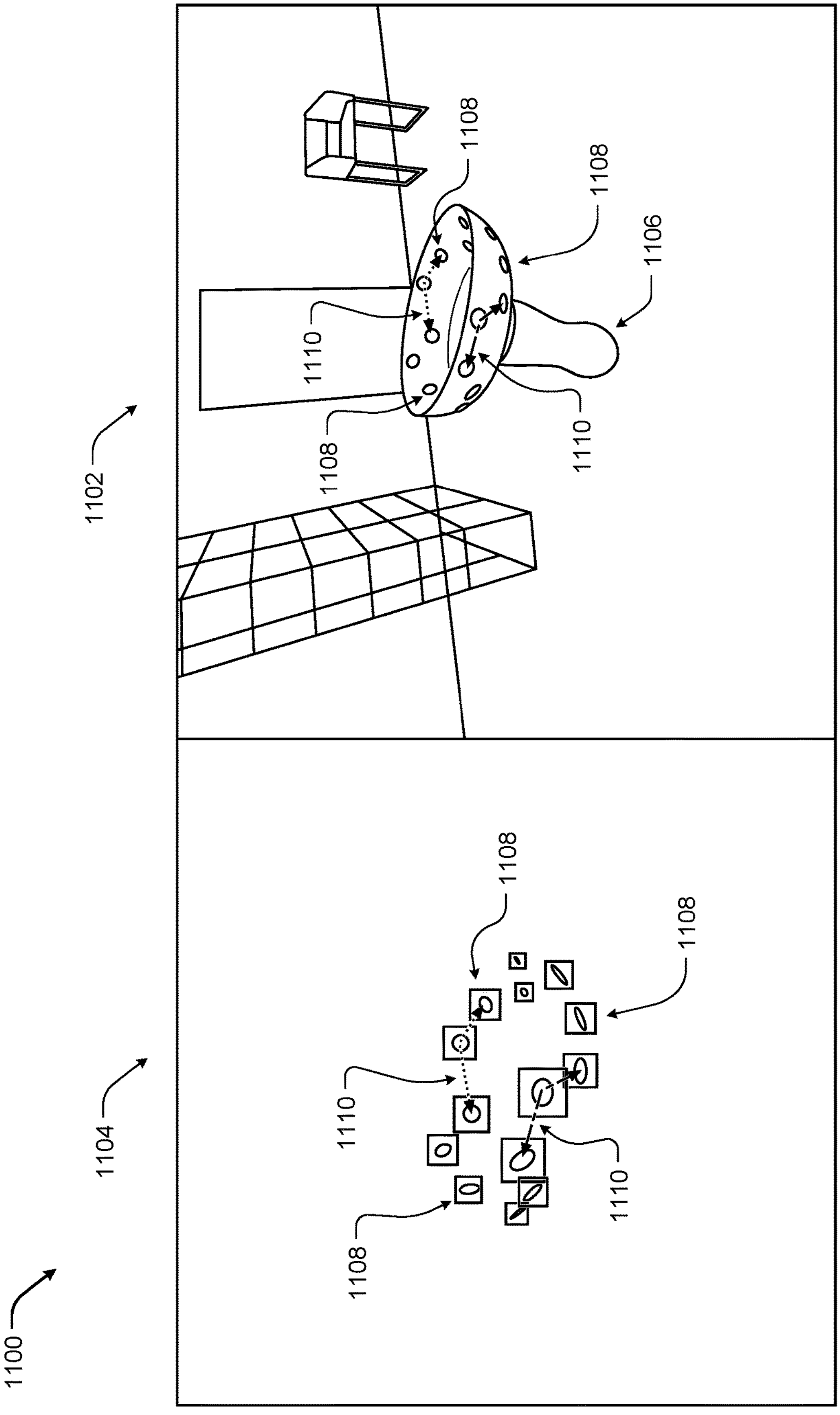
FIG. 11 is an example visualization of controller pose tracking according to some implementations.

FIG. 11 is an example visualization 1100 of controller pose tracking according to some implementations. In the current example, the image data captured by a headset device is displayed in two windows, such as a first window 1102 and a second window 1104. In the first window 1102 the visual data of the image data is displayed. The image data includes a room with some furniture as well as a controller 1106. The controller 1106 includes a number of model points detected as bright blobs, generally indicated by 1108, in the image data and on a round or circular portion of the controller 1106. In this example, the system may have detected two associations or groups of model points, generally indicated by 1110.

In the second window 1104, a filter may have been applied to the image data, such that only the bright blobs 1108 remain. In this manner, the system, discussed herein, may process the image data to determine groups of model points, associations between groups or points, determine identities of model points or controllers, as well as disambiguate the controllers while processing less image data and consuming less computing resources, as discussed above.

Figure 12:
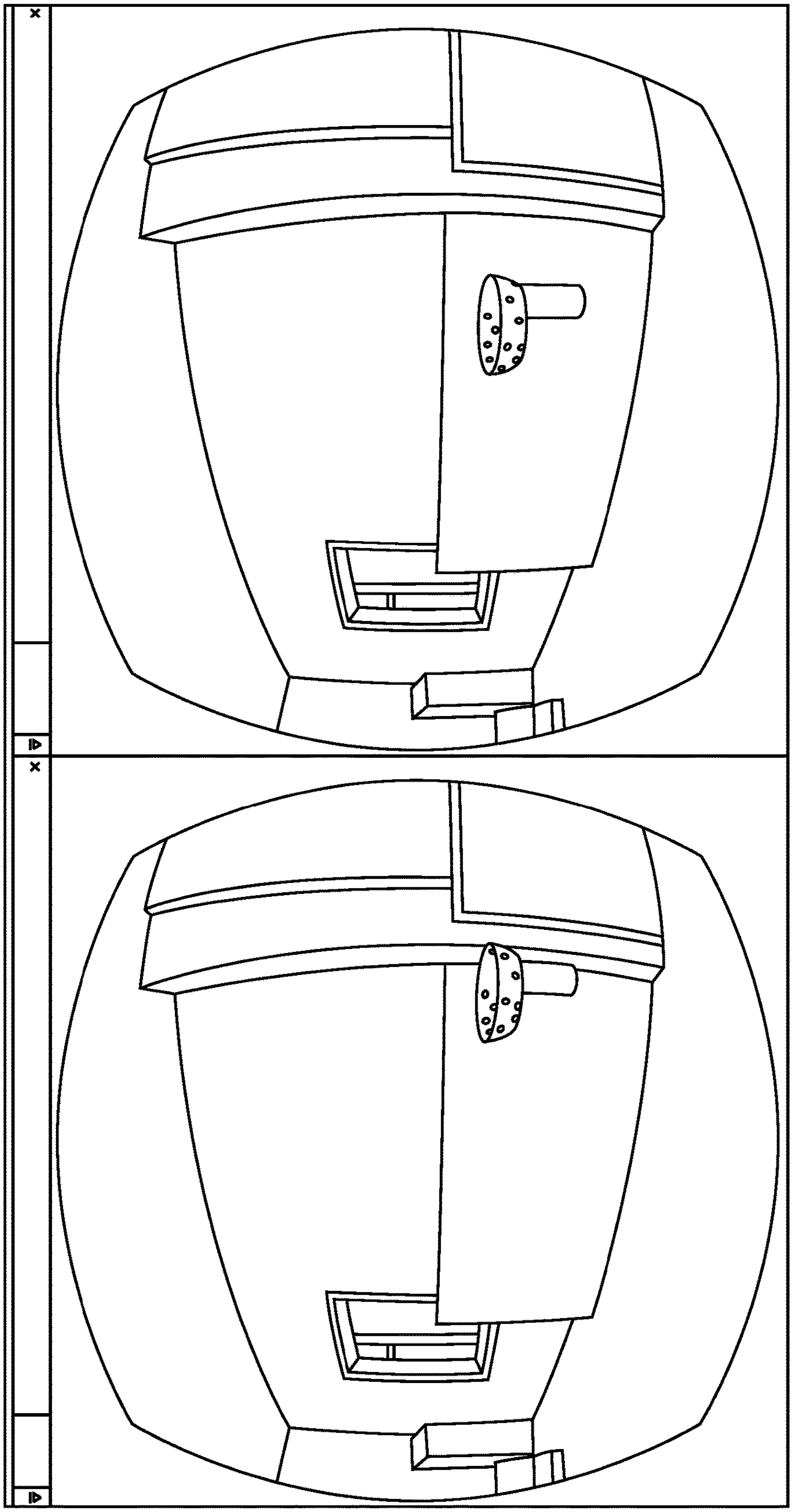
FIG. 12 is another example visualization of controller pose tracking according to some implementations.

FIG. 12 is another example visualization 1200 of controller pose tracking according to some implementations. In the current example, a fisheye camera or image device may be utilized to generate a right and left view of the physical environment to assist with detecting the controller.

Although the subject matter has been described in language specific to structural features, it is to be understood that the subject matter defined in the appended claims is not necessarily limited to the specific features described. Rather, the specific features are disclosed as illustrative forms of implementing the claims.

EXAMPLE CLAUSES

A. A method comprising: receive image data from one or more image devices, the image data including data representatives of an object in a physical environment; determining a plurality of candidate blobs within the image data, individual ones of the candidate blobs having an intensity above an intensity threshold; determining a location associated with individual ones of the plurality of candidate blobs; generating one or more sets of associations for individual ones of the plurality of candidate blobs; generating a plurality of candidate poses for the object based at least in part on the sets of associations; selecting a pose of the object from the plurality of candidate poses.

B. The method as recited in any of claim A, further comprising filtering the image data to remove data having an intensity below an intensity threshold.

C. The system as recited in any of claims A or B, wherein generating one or more sets of associations is based at least in part on a nearest neighbor based at least in part on the location associated with the individual ones of the plurality of candidate blobs.

D. The system as recited in any of claims A to C, wherein determining the location associated with individual ones of the plurality of candidate blobs further comprises determining a size of the individual ones of the plurality of candidate blobs.

E. The system as recited in any of claims A to D, wherein receive the image data from the one or more image devices further comprises receiving first image data from a first image device and second image data from a second image device and the method further comprises: projecting model points of a model into the first image data and the second image data; determining a first number of model points that are within a bounds of the first image data; determining a second number of model points that are within a bounds of the second image data; responsive to determining that the first number of model points meets or exceed a threshold number and the second number of model points fails to meet or exceed the threshold number, utilizing the first image data to track the pose of the object.

F. The system as recited in any of claims A to D, wherein receive the image data from the one or more image devices further comprises receiving first image data from a first image device and second image data from a second image device and the method further comprises: projecting model points of a model into the first image data and the second image data; determining a first number of model points that are within a bounds of the first image data; determining a second number of model points that are within a bounds of the second image data; responsive to determining that the first number of model points fails to meet or exceed a threshold number and the second number of model points fails to meet or exceed the threshold number, utilizing the first image data and the second image data to track the pose of the object.

G. The system as recited in any of claims A to D, wherein receive the image data from the one or more image devices further comprises receiving first image data from a first image device and second image data from a second image device and the method further comprises: projecting model points of a model into the first image data and the second image data; determining a first number of model points that are within a bounds of the first image data; determining a second number of model points that are within a bounds of the second image data; determining a first distance from a set of model points detected in the first image data to a center of the first image device; determining a second distance from a set of model points detected in the second image data to a center of the second image device; determining that the first number of model points meets or exceed a threshold number and the second number of model points meets or exceed the threshold number; selecting either the first image device or the second image device to track the pose of the object based at least in part on the first distance and the second distance.

H. The system as recited in any of claims A to G, wherein the object is a hand-held controller associated with the system.

I. The system as recited in any of claims A to H, further comprising performing one more actions within a virtual environment based at least in part on the selected pose.

J. A computer program product comprising coded instructions that, when run on a computer, implement a method as claimed in any of claims A to I.

K. A system comprising: a display for presenting a virtual environment to a user; one or more image devices for capturing image data associated with a physical environment surrounding the user; one or more wireless communication interfaces for receiving data from a first hand-held controller; one or more processors; non-transitory computer-readable media storing computer-executable instructions, which when executed by the one or more processors cause the one or more processors to perform operations comprising: determining a plurality of candidate blobs within the image data; generating one or more valid associations for individual ones of the plurality of candidate blobs based at least in part on a stored model; generating a plurality of candidate poses for the first-hand held controller based at least in part on the one or more valid associations; eliminating at least one of the plurality of candidate poses based at least in part on the data from the first hand-held controller; and selecting a pose of the first hand-held controller from the plurality of candidate poses.

L. The system as recited in claim K, wherein: the one or more wireless communication interfaces for receiving data from a second hand-held controller; and the operations further comprise: generating a second plurality of candidate poses for the second-hand held controller based at least in part on the one or more sets of candidate blobs and the one or more associations; eliminating at least one of the second plurality of candidate poses based at least in part on the data from the second hand-held controller; and selecting a pose of the second hand-held controller from the second plurality of candidate poses.

M. The system as recited in any of claims K or L, wherein the operations further comprise: determining an intensity of individual ones of the plurality of candidate blobs; determining a change in intensity of the individual ones of the plurality of candidate blobs based at least in part on the intensity and a prior intensity of the individual ones of the plurality of candidate blobs from a prior frame of the image data; and determining an identity of the first hand-held controller based at least in part on the change in intensity of the individual ones of the plurality of candidate blobs and a known bit sequence.

N. The system as recited in claim K, further comprising: determining a size of individual ones of the candidate blobs; and eliminating at least one of the second plurality of candidate poses based at least in part on the size of the individual ones of the candidate blobs.

O. The system as recited in any of claims K to N, wherein the operations further comprise performing one more actions within the virtual environment based at least in part on the pose of the first hand-held controller.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein. As can be understood, the components discussed herein are described as divided for illustrative purposes. However, the operations performed by the various components can be combined or performed in any other component. It should also be understood that components or steps discussed with respect to one example or implementation may be used in conjunction with components or steps of other examples.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method comprising:

receive image data from one or more image devices, the image data including data representatives of an object in a physical environment and wherein the image data includes first image data from a first image device and second image data from a second image device;

determining a plurality of candidate blobs within the image data, individual ones of the candidate blobs having an intensity above an intensity threshold;

determining a location associated with individual ones of the plurality of candidate blobs;

generating one or more sets of associations for individual ones of the plurality of candidate blobs;

generating a plurality of candidate poses for the object based at least in part on the sets of associations;

selecting a pose of the object from the plurality of candidate poses;

projecting model points of a model into the first image data and the second image data;

determining a first number of model points that are within a bounds of the first image data;

determining a second number of model points that are within a bounds of the second image data; and responsive to determining that the first number of model points meets or exceed a threshold number and the second number of model points fails to meet or exceed the threshold number, utilizing the first image data to track the pose of the object.

2. The method as recited in claim 1, further comprising filtering the image data to remove data having an intensity below an intensity threshold.

3. The method as recited in claim 1, wherein generating one or more sets of associations is based at least in part on a nearest neighbor based at least in part on the location associated with the individual ones of the plurality of candidate blobs.

4. The method as recited in claim 1, wherein determining the location associated with individual ones of the plurality of candidate blobs further comprises determining a size of the individual ones of the plurality of candidate blobs.

5. The method as recited in claim 1, wherein receiving the image data from the one or more image devices further comprises receiving first image data from a first image device and second image data from a second image device and the method further comprises:

determining a first distance from a set of model points detected in the first image data to a center of the first image device;

determining a second distance from a set of model points detected in the second image data to a center of the second image device; and selecting, based at least in part on the first distance and the second distance, the first image data to track the pose of the object based.

6. The method as recited in claim 1, wherein the object is a hand-held controller.

7. The method as recited in claim 1, further comprising performing one more actions within a virtual environment based at least in part on the selected pose.

8. The method as recited in claim 1, wherein generating one or more sets of associations for the individual ones of the plurality of candidate blobs further comprises:

accepting an association when a distance between the individual ones of the plurality of candidate blobs is less than a predetermined pixel threshold.

9. The method as recited in claim 1, wherein:

the intensity threshold is an intensity difference threshold; and determining that the individual ones of the candidate blobs have the intensity above the intensity threshold includes determining that a change in intensity for the individual ones of the candidate blobs between a current frame and a prior frame meets or exceeds the intensity difference threshold.

10. A system comprising:

a display for presenting a virtual environment to a user;

one or more image devices for capturing image data associated with a physical environment surrounding the user;

one or more wireless communication interfaces for receiving data from a first hand-held controller;

one or more processors;

non-transitory computer-readable media storing computer-executable instructions, which when executed by the one or more processors cause the one or more processors to perform operations comprising:

determining a plurality of candidate blobs within the image data;

generating one or more valid associations for individual ones of the plurality of candidate blobs based at least in part on a stored model;

generating a plurality of candidate poses for a first-hand held controller based at least in part on the one or more valid associations;

eliminating at least one of the plurality of candidate poses based at least in part on the data from the first hand-held controller; and selecting a pose of the first hand-held controller from the plurality of candidate poses;

determining an intensity of individual ones of the plurality of candidate blobs;

determining a change in intensity of the individual ones of the plurality of candidate blobs based at least in part on the intensity and a prior intensity of the individual ones of the plurality of candidate blobs from a prior frame of the image data; and determining an identity of the first hand-held controller based at least in part on the change in intensity of the individual ones of the plurality of candidate blobs and a known bit sequence.

11. The system as recited in claim 10, wherein:

the one or more wireless communication interfaces for receiving data from a second hand-held controller; and the operations further comprise:

generating a second plurality of candidate poses for a second-hand held controller based at least in part on the plurality of candidate blobs and the one or more valid associations;

eliminating at least one of the second plurality of candidate poses based at least in part on the data from the second hand-held controller; and selecting a pose of the second hand-held controller from the second plurality of candidate poses.

12. The system as recited in claim 10, further comprising:

determining a size of individual ones of the candidate blobs; and eliminating at least one of the plurality of candidate poses based at least in part on the size of the individual ones of the candidate blobs.

13. The system as recited in claim 10, wherein the operations further comprise performing one more actions within the virtual environment based at least in part on the pose of the first hand-held controller.

14. The system as recited in claim 10, wherein determining the identity of the first hand-held controller is based at least in part on if a Hamming distance associated with the intensity of the individual ones of the plurality of candidate blobs is less than or equal to the distance threshold.

15. One or more non-transitory computer-readable media storing computer-executable instructions, which when executed by a one or more processors cause the one or more processors to perform operations comprising:

receive image data from one or more image devices, the image data including data representatives of an object in a physical environment and wherein the image data includes first image data from a first image device and second image data from a second image device;

determining a plurality of candidate blobs within the image data, individual ones of the candidate blobs having an intensity above an intensity threshold;

determining a location associated with individual ones of the plurality of candidate blobs;

generating one or more sets of associations for individual ones of the plurality of candidate blobs;

generating a plurality of candidate poses for the object based at least in part on the sets of associations;

selecting a pose of the object from the plurality of candidate poses;

projecting model points of a model into the first image data and the second image data;

determining a first number of model points that are within a bounds of the first image data;

determining a second number of model points that are within a bounds of the second image data; and responsive to determining that the first number of model points fails to meet or exceed a threshold number and the second number of model points fails to meet or exceed the threshold number, utilizing the first image data and the second image data to track the pose of the object.

16. The one or more non-transitory computer-readable media as recited in claim 15, wherein generating one or more sets of associations is based at least in part on a nearest neighbor based at least in part on the location associated with the individual ones of the plurality of candidate blobs.

17. The one or more non-transitory computer-readable media as recited in claim 15, wherein determining the location associated with individual ones of the plurality of candidate blobs further comprises determining a size of the individual ones of the plurality of candidate blobs.

18. The one or more non-transitory computer-readable media as recited in claim 15, wherein receiving the image data from the one or more image devices further comprises receiving first image data from a first image device and second image data from a second image device and the operations further comprises:

determining a first distance from a set of model points detected in the first image data to a center of the first image device;

determining a second distance from a set of model points detected in the second image data to a center of the second image device; and selecting, based at least in part on the first distance and the second distance, either the first image device or the second image device to track the pose of the object.

19. The one or more non-transitory computer-readable media as recited in claim 15, wherein generating one or more sets of associations for the individual ones of the plurality of candidate blobs further comprises: accepting an association when a distance between the individual ones of the plurality of candidate blobs is less than a predetermined pixel threshold.

20. The one or more non-transitory computer-readable media as recited in claim 15, wherein:

the intensity threshold is an intensity difference threshold; and determining that the individual ones of the candidate blobs have the intensity above the intensity threshold includes determining that a change in intensity for the individual ones of the candidate blobs between a current frame and a prior frame meets or exceeds the intensity difference threshold.

* * * * *